US012698653B2

(12) United States Patent
Bacon

(10) Patent No.: US 12,698,653 B2
(45) Date of Patent: Aug. 4, 2026

(54) COMPARTMENT DOOR LATCH

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

(*) Notice: Subject to any disclaimer, the term of this patent is extended or adjusted under 35 U.S.C. 154(b) by 48 days.

(21) Appl. No.: 18/797,928

(22) Filed: Aug. 8, 2024

(65) Prior Publication Data

US 2026/0043279 A1 Feb. 12, 2026

(51) Int. Cl.

| | |
|---|---|
| ***E05B 81/16*** | (2014.01) |
| ***E05B 81/06*** | (2014.01) |
| ***E05B 81/30*** | (2014.01) |
| ***E05B 81/42*** | (2014.01) |
| ***E05B 81/46*** | (2014.01) |
| ***E05B 81/56*** | (2014.01) |
| ***E05B 81/68*** | (2014.01) |
| ***E05B 81/82*** | (2014.01) |
| ***E05B 83/16*** | (2014.01) |

(52) U.S. Cl.

CPC .............. *E05B 81/16* (2013.01); *E05B 81/06* (2013.01); *E05B 81/30* (2013.01); *E05B 81/42* (2013.01); *E05B 81/46* (2013.01); *E05B 81/56* (2013.01); *E05B 81/68* (2013.01); *E05B 83/16* (2013.01); *E05B 81/82* (2013.01)

(58) Field of Classification Search

CPC .......... E05B 81/16; E05B 81/06; E05B 81/30; E05B 81/42; E05B 81/46; E05B 81/56; E05B 81/68; E05B 81/82; E05B 83/16

USPC ........................................................ 70/279.1

See application file for complete search history.

(56) References Cited

U.S. PATENT DOCUMENTS

| | | | | |
|---|---|---|---|---|
| 437,007 | A | 9/1890 | Sorensen | |
| 1,964,066 | A | 6/1934 | Kuszmaul | |
| 2,427,386 | A * | 9/1947 | Claud-Mantle ......... | E05B 85/22<br>292/DIG. 31 |
| 2,743,953 | A * | 5/1956 | Marra ................... | E05B 63/246<br>292/341.18 |

(Continued)

FOREIGN PATENT DOCUMENTS

| | | |
|---|---|---|
| EP | 1162332 | 12/2001 |
| EP | 2278102 | 1/2011 |
| WO | 2017129333 | 8/2017 |

*Primary Examiner* — Nathan Cumar

(74) *Attorney, Agent, or Firm* — PRICE HENEVELD LLP

(57) ABSTRACT

A compartment door latch includes a housing and a plunger mounted within the housing. The plunger has an extended position and a retracted position, and a resilient member urges the plunger to the extended position. A manually actuated exterior latch paddle handle mounted to an outer face of the outer housing is operably coupled with a paddle cam and a plunger cam is operably coupled with the paddle cam and the plunger. A lock bolt driver is operably coupled with a key lock and operably coupled with a lock bolt adapted to prevent movement of the plunger in a locked position. An electrically actuated motor and motor actuator operably coupled with the lock bolt, where a controller actuates the motor electrically actuated motor and motor actuator. The lock bolt is selectively displaceable between a locked position and the unlocked position by either the key lock or the controller.

22 Claims, 30 Drawing Sheets

(56) References Cited

U.S. PATENT DOCUMENTS 4,195,867 A * 4/1980 Baillie ...................... E05C 1/10 70/81
4,732,417 A * 3/1988 Yang ........................ E05C 1/14 292/336.3
4,763,431 A * 8/1988 Allan ...................... F41A 17/04 42/70.11
4,896,906 A * 1/1990 Weinerman ........... E05B 85/243 292/341.12
4,986,576 A * 1/1991 Anderson ............... E05B 35/08 292/DIG. 31
5,127,686 A * 7/1992 Gleason .................... E05B 5/00 292/216
5,425,560 A * 6/1995 Andersen ................ E05B 83/30 292/146
5,983,682 A * 11/1999 Parikh ....................... E05B 5/00 292/DIG. 31
6,131,966 A * 10/2000 Hensley .................. E05B 63/18 70/DIG. 6
6,309,008 B1 * 10/2001 Bacon .................... B62D 25/12 292/38
6,409,234 B1 * 6/2002 Larsen .................... E05C 1/145 292/DIG. 31
6,513,353 B1 * 2/2003 Weinerman ............. E05C 9/047 292/DIG. 31
6,651,467 B1 * 11/2003 Weinerman ............... E05B 5/00 292/216
D485,155 S * 1/2004 Bacon ............................ D8/338
6,685,240 B2 * 2/2004 Bacon ..................... E05B 85/18 292/336.3
6,701,761 B1 * 3/2004 Chang ..................... E05B 35/08 70/369
8,186,191 B2 * 5/2012 Bacon ..................... E05B 59/00 292/201
8,347,667 B2 * 1/2013 Bacon ..................... E05B 59/00 292/216
8,393,187 B2 * 3/2013 Bacon ..................... E05B 59/00 292/216
8,419,089 B2 * 4/2013 Bacon ....................... E05C 1/12 119/501
8,439,409 B2 * 5/2013 Uto ........................... E05C 3/24 292/216
8,621,901 B2 * 1/2014 Bacon ..................... E05B 9/086 70/369
8,770,633 B2 * 7/2014 Stango .................. E05B 13/101 292/61
8,789,858 B2 * 7/2014 Loret de Mola ....... E05C 1/085 292/164
8,960,733 B1 * 2/2015 Smith ....................... E05C 7/02 292/226
9,085,919 B2 * 7/2015 Bacon ..................... E05B 81/77
9,145,713 B1 * 9/2015 Norris ..................... E05B 53/00
9,170,598 B2 * 10/2015 Goetze ..................... G05G 1/04
9,464,467 B1 * 10/2016 Flannery ............. E05B 65/0007
9,940,767 B2 * 4/2018 Bacon ..................... E05B 81/66
10,378,237 B2 8/2019 Bacon et al.
10,400,487 B1 9/2019 Flannery et al.
10,982,469 B2 4/2021 Frattini et al.
10,988,963 B2 4/2021 Bacon
11,377,885 B2 7/2022 Bacon
11,692,379 B2 7/2023 Bacon
2010/0154489 A1 * 6/2010 Bacon ..................... E05B 59/00 70/77
2012/0174633 A1 * 7/2012 Bacon ..................... E05B 85/22 70/77
2012/0192602 A1 * 8/2012 Bacon ................... E05B 47/026 70/278.1
2012/0274457 A1 * 11/2012 Burns ..................... E05B 85/18 70/91
2013/0097938 A1 * 4/2013 Madrid ................. E05B 63/143 49/506
2013/0098124 A1 * 4/2013 Williams .................. E05B 7/00 292/210
2013/0133384 A1 * 5/2013 Pickar ..................... E05B 85/12 70/91
2015/0330108 A1 * 11/2015 Harrison ............. E05B 65/5253 292/200
2015/0345188 A1 * 12/2015 Puscas .................... E05B 85/14 292/336.3
2016/0017638 A1 * 1/2016 Dore Vasudevan .... E05B 55/12 292/137
2016/0130845 A1 * 5/2016 Park ........................ E05B 77/06 292/336.3
2017/0030107 A1 * 2/2017 Naka ....................... E05B 85/16
2018/0016810 A1 * 1/2018 Bacon ..................... E05B 81/66
2019/0128030 A1 * 5/2019 Bacon ....................... E05C 7/02
2019/0316391 A1 * 10/2019 Bacon ..................... E05B 59/00
2020/0063468 A1 * 2/2020 Bacon ....................... E05B 9/08
2020/0240183 A1 * 7/2020 Bacon ..................... E05B 85/13
2021/0301561 A1 * 9/2021 Cumbo ................. E05F 15/622
2023/0069249 A1 * 3/2023 Bos .................... G07C 9/00658
2024/0003170 A1 1/2024 Bacon
2024/0174340 A1 * 5/2024 Kloetergens ............ E05B 81/16
2024/0254815 A1 8/2024 Bacon
2024/0328215 A1 10/2024 Bacon

* cited by examiner

COMPARTMENT DOOR LATCH

FIELD OF THE INVENTION

The present invention relates to a compartment door latch for a closable compartment door having an outer perimeter adapted to secure the closable compartment door in closed condition.

BACKGROUND OF THE INVENTION

Compartment doors are commonly installed in many vehicle configurations for securing the contents of compartments provided therein. In particular, recreational vehicles typically are manufactured with multiple compartments, with each provided with a compartment door and a door latch assembly. The compartment doors are defined by an outer perimeter that matches and often seals the inner perimeter of the opening of the compartment.

Such door latch assemblies are generally well-known in the art and may be flush mounted on an associated closure to facilitate selectively shifting the compartment door between an open position and a closed position. Such latch assemblies are typically equipped with a lock to secure the compartment door in the closed position. In the case of storage compartments doors used on recreational vehicles, manually actuated rotary latch lock assemblies are often used to secure the storage compartment door in the closed position.

Alternatively, so-called slam door latch assemblies are becoming increasingly more common as latch assemblies that are used to secure recreational vehicle storage compartment doors in the closed position. Slam door latch assemblies may include an outer housing and an inner housing, within which is generally situated a retractable latch plunger extending beyond the perimeter of the compartment door. When in the closed position, the retractable plunger may be disposed against an inner wall surface of the compartment or within a striker, thus preventing the compartment door from being opened. To further secure the compartment door, the door latch may be lockable, using a door latch operable by a traditional key and key cylinder arrangement.

The compartment door may be closed without manual retraction of the retractable latch plunger, that is, an inclined surface on a distal end of the retractable plunger temporarily urges the retractable plunger to a retracted position during the closing event and can thus be effectively "slammed" shut. An exterior latch paddle handle assembly mounted to the outer housing may be operably coupled with the retractable latch plunger, whereby the retractable latch plunger may be shifted between a latched and an unlatched position. Typically, such slam door latch assemblies also include a lock that restrains the exterior latch paddle handle and thus prevents operation of the retractable latch plunger for security.

Heretofore, while such slam door latch assemblies have proven generally effective, they experience certain drawbacks. More particularly, the use of such door latches with keyless lock mechanisms has been problematic. An improved compartment door latch is desired.

SUMMARY OF THE INVENTION

One object of the present invention is a compartment door latch including an inner housing and an outer housing forming an interior chamber. A plunger may be mounted to an interior face of one of the inner housing or outer housing, the plunger having an extended position and a retracted position, and a resilient member may be operably coupled with the plunger and urging the plunger to the extended position. A plunger actuator may be operably coupled with the plunger, the plunger actuator comprising a manually actuated exterior latch paddle handle mounted to an outer face of the outer housing, a paddle cam operably coupled with the exterior latch paddle handle, and a plunger cam operably coupled with the paddle cam and the plunger, whereupon actuation of the exterior latch paddle handle from a closed position to an open position displaces the paddle cam and rotates the plunger cam to displace the plunger from the extended position to the retracted position against the urging of the resilient member. A locking mechanism comprising a lock bolt having a locked position and an unlocked position and adapted to prevent movement of the plunger in the locked position may be operably coupled with a key lock and operably coupled with the lock bolt, an electrically actuated motor and a motor actuator operably coupled with the lock bolt, and a controller for actuating the motor electrically actuated motor and motor actuator. The lock bolt may be selectively displaceable between the locked position and the unlocked position by either the key lock or the controller.

Yet another aspect of the present invention is a compartment door latch for a closable compartment door having an outer perimeter a housing forming an interior chamber and mounted to the compartment door. A plunger may be mounted within the housing, the plunger having an extended position extending outside of the perimeter of the compartment door and a retracted position retracted within the perimeter of the compartment door, and a resilient member may be operably coupled with the plunger and urge the plunger to the extended position. A manually actuated exterior latch paddle handle may be mounted to an outer face of the housing, the exterior latch paddle handle having a closed position to an open position. A paddle cam may be operably coupled with the exterior latch paddle handle and extend into the interior chamber. A plunger cam may be operably coupled with the paddle cam and the plunger, whereupon actuation of the exterior latch paddle handle from the closed position to the open position displaces the paddle cam and actuates the plunger cam to displace the plunger from the extended position to the retracted position against the urging of the resilient member. A lock bolt having a locked position and an unlocked position may be adapted to prevent movement of the plunger in the locked position. A lock bolt driver may be disposed upon a lock bolt clutch operably coupled with a key lock and operably coupled with the lock bolt, wherein a lock bolt clutch and the lock bolt driver are rotatable between a first locked position and a second unlock position. An electrically actuated motor and a motor actuator may be operably coupled with the lock bolt, and a controller for actuating the motor actuator, wherein the motor actuator is rotatable between a first locked position and a second unlock position. The lock bolt may be selectively displaceable between the locked position and the unlocked position by either the key lock or the controller.

Yet a further aspect of the present invention is a compartment door latch for a closable compartment door having an outer perimeter including an inner housing comprising a base plate having a base recess in an outer face thereof and an outer housing comprising a paddle recess in an outer face thereof, wherein the paddle recess is received within the base recess and an interior chamber is defined therebetween. A plunger may be mounted to one of the inner housing or outer housing, the plunger having an extended position extending outside of the perimeter of the compartment door and a retracted position retracted within the perimeter of the compartment door, and a resilient member may be operably coupled with the plunger and urging the plunger to the extended position. A plunger actuator may be operably coupled with the plunger, the plunger actuator comprising a manually actuated exterior latch paddle handle rotatably mounted to the outer face and within the paddle recess of the outer housing, a paddle cam operably coupled with the exterior latch paddle handle, and a plunger cam may be rotatably mounted and operably coupled with the paddle cam and the plunger, whereupon actuation of the exterior latch paddle handle from a closed position to an open position displaces the paddle cam and rotates the plunger cam to displace the plunger from the extended position to the retracted position against the urging of the resilient member. A locking mechanism may comprise a lock bolt having a locked position and an unlocked position, a lock bolt driver disposed on a lock bolt clutch and operably coupled with a key lock and operably coupled with the lock bolt, an electrically actuated motor and a motor actuator operably coupled with the lock bolt, and a controller for actuating the motor electrically actuated motor and motor actuator. A battery pack may be adapted to energize the electrically actuated motor mounted to the inner housing. A lock bolt stop may be disposed at a proximal end of the plunger that is engaged by the lock bolt when the lock bolt is displaced to the locked position, or a lock bolt stop disposed on the paddle cam that is engaged by the lock bolt when the lock bolt is displaced to the locked position. The lock bolt may be selectively displaceable between the locked position and the unlocked position by either the key lock or the controller.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
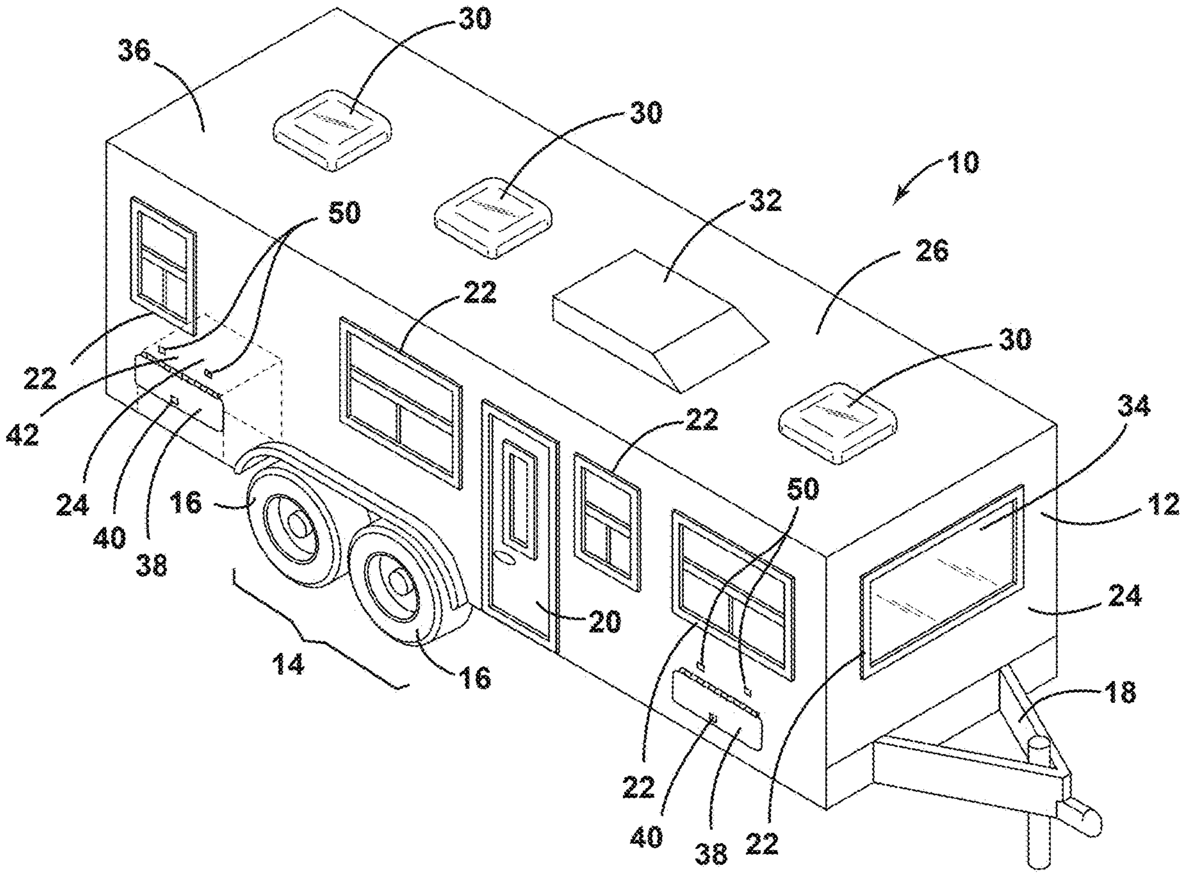
FIG. 1 is a front side perspective view of a recreational vehicle provided with storage compartment door assemblies in accordance with the present disclosure.

Referring to FIG. 1, reference numeral 10 generally designates a recreational vehicle travel trailer particularly adapted for being towed by a motor vehicle (not shown). However, other recreational vehicle 10 configurations may advantageously employ the benefits of the present disclosure, such as and including motor coaches and so-called fifth-wheeled travel trailers. In the embodiment contemplated herein, the recreational vehicle 10 generally comprises a body 12 that is primarily supported by a pair of axles 14, each comprising at least one pair of opposing road wheels and an axle assembly 16, and a trailer tongue 18 by which the recreational vehicle 10 may be attached to the tow vehicle. As is typical, recreational vehicle 10 has an entry door assembly 20 for egress and ingress and a plurality of windows 22 arranged on exterior side walls 24 of the body 12. A roof portion 26 is provided to enclose the body 12 and typically includes one or more ceiling vents 30, typically arranged along the longitudinal length of the recreational vehicle 10. Optionally, an air conditioning unit 32 can be mounted on roof portion 26 as well.

The storage compartment door assembly 38, to which the door latch assembly 40 of the present disclosure may be applied, is primarily installed to provide access to the interior of a storage compartment 42 through the exterior side walls 24 of the body 12 of the recreational vehicle 10. That is, the storage compartment door assembly 38 is typically operable between a closed position, in which the contents of the storage compartment 42 may be secured and the elements, such as the rain, snow, and wind, may be sealed from the interior 34 of the body 12 of the recreational vehicle 10, and an open position, by which access to the interior of the storage compartment 42 and the contents secured therein may be allowed relative the exterior side walls 24 of the body 12 of the recreational vehicle 10.

Typically, such storage compartments 42 and corresponding storage compartment door assemblies 38 are arranged about the exterior of the recreational vehicle 10 at locations and in quantities and capacities as may be dictated by the design of the recreational vehicle 10 and the needs of the users of the recreational vehicle 10. As shown in FIG. 1, two storage compartments 42 and corresponding storage compartment door assemblies 38 are depicted. However, the door latch assembly 40 of the present disclosure can be used in a wide variety of such storage compartments 42 and corresponding storage compartment door assemblies 38, as will be made evident to those skilled in the art in accordance with the instant disclosure.

As shown in FIGS. 2, 5, 6, 19, 20, 23A, and 23B, the storage compartment door assembly 38 primarily consists of a closable door panel 58 having an exterior surface 44 and an interior surface 46 mounted to the exterior side walls 24 of the body 12 of the recreational vehicle 10 by a horizontal hinge assembly 48, typically a piano-type hinge. Thus, the storage compartment door assembly 38 may be pivoted between the open position and the closed position. Typically, a retainer latch or magnet assembly 50 is mounted above the storage compartment door assembly 38 to releasably maintain the storage compartment door assembly 38 in the open position until the operator desires to close the same.

The storage compartment door assembly 38 may be further provided with the door latch assembly 40 disposed on a side of the storage compartment door assembly 38 opposite the side having the hinge assembly 48. The door latch assembly 40 preferably engages a corresponding latch striker 52 on an interior surface 36 of the storage compartment 42, as shown in FIGS. 5, 6, 19, 20, 23A, and 23B. Preferably, the latch striker 52 is mounted near edge 54 of the storage compartment door assembly 38 and proximate the opening 56 for the storage compartment door assembly 38. The closable door panel 58 of the storage compartment door assembly 38 may be formed by an aluminum- or fiberglass-clad exterior panel 60, an aluminum- or fiberglass-clad interior panel 62, and a filler material 64 disposed between the exterior and interior panels 60, 62. The filler material 64 may consist of a structural foam material that provides structural support, as well as high insulating qualities, at an extremely low weight.

The compartment door latch assembly 40 of the storage compartment door assembly 38 is an improvement on a standard recreational vehicle "slam latch" and generally includes an inner housing 70 comprising a base plate 66 having a base recess 68 in an outer face 69 thereof and an outer housing 72 comprising a paddle recess 73 in an outer face 112 thereof in juxtaposed relation with one another. The compartment door latch assembly 40 may be mounted to an opening 74 in the closable door panel 58 of the storage compartment door assembly 38, wherein the paddle recess 73 is received within the base recess 68 and an interior chamber 77 is defined therebetween. This generally two-piece design readily allows for installation in compartment doors from 0.5 inch thick to 1.375 inch thick without any edge fabrication, as the retractable plunger is captured inside of the door frame, as perhaps best shown in FIGS. 23A and 23B. The outer housing may be constructed from injection molded, fiber reinforced nylon or other similar materials. The inner housing may be constructed from injection molded, fiber reinforced nylon or other similar materials, or alternatively may be fabricated from metal, such as aluminum.

The inner housing 70 and the outer housing 72 are operably connected to each other through the opening 74 in the closable door panel 58 of the storage compartment door assembly 38, wherein the closable door panel 58 of the storage compartment door assembly 38 is disposed between the inner housing 70 and the outer housing 72. Preferably, the size of the opening 74 in the closable door panel 58 of the storage compartment door assembly 38 is smaller than the periphery of each of the inner housing 70 and the outer housing 72, such that when the inner housing 70 and the outer housing 72 are operably coupled and the door latch assembly 40 of the storage compartment door assembly 38 is finally assembled, the storage compartment 42 is essentially sealed from the elements.

Figure 2:
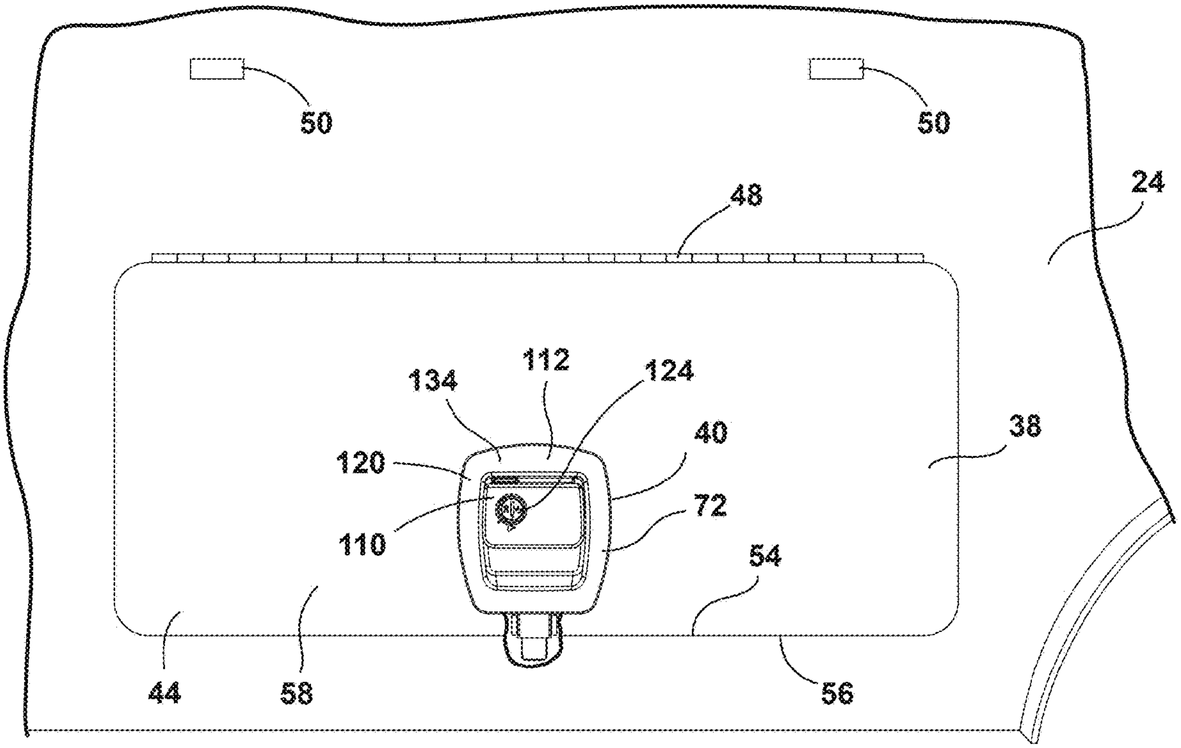
FIG. 2 is a plan exterior view of the exterior surface of one of the storage compartment door assemblies shown in FIG. 1, further showing the exterior surface of the outer housing of the door latch assembly.

As perhaps may be best appreciated from FIG. 2, the door latch assembly 40 of the storage compartment door assembly 38 may be a slam door latch assembly 40, which may include a retractable latch plunger 76 having an inclined surface 78 at an exposed distal end 80, such that the inclined surface 78 faces the latch striker 52 when the storage compartment door assembly 38 is in the open position. The retractable latch plunger 76 is moveable within the outer housing 72 between an extended position and a retracted position, wherein the outer housing 72 is further provided with an elongated recess 82.

According to the present disclosure, two embodiments are described. The first embodiment is shown in FIGS. 3-16, where the compartment door latch assembly 40 comprises a lock bolt stop 154 at a proximal end 106 of the retractable latch plunger 76 that is engaged by a lock bolt 142 when the lock bolt 142 is displaced to the locked position and thereby prevents displacement of the retractable latch plunger 76 from the extended to the retracted position. In addition, as the lock bolt 142 interferes with movement of the retractable latch plunger 76, the restrained retractable latch plunger 76 also prevents motion of an exterior latch paddle handle 114.

Alternatively, in the second embodiment shown in FIGS. 17-32, the compartment door latch assembly 40 comprises a paddle cam 120 having a lock bolt stop 154 that is engaged by the lock bolt 142 when the lock bolt 142 is displaced to the locked position and thereby prevents actuation of the exterior latch paddle handle 114 from the closed position to the open position. This further prevents movement of the paddle cam 120, which in turn prevents rotation of the plunger cam 122, which ultimately prevents displacement of the retractable latch plunger 76 to the open position.

In either embodiment, the lock bolt stop 154 may be engaged by the lock bolt 142 when the lock bolt 142 is displaced to the locked position and thereby ultimately prevents displacement of the retractable latch plunger 76 from the extended to the retracted position. In further describing these embodiments, common reference numerals are applied to the same or similar structures for simplicity in presentation and where differences exist, such differences will be further described.

As seen in the Figures, the retractable latch plunger 76 comprises a main body 86 received within and slidably mounted within the elongated recess 82, which may be disposed on the interior surface 85 of the outer housing 72, as shown in FIGS. 3-16 in the case of the first embodiment, or which may be disposed in a sleeve 158 attached to the interior surface 85 of the inner housing 70, as shown in FIGS. 17-32 in the case of the second embodiment.

The retractable latch plunger 76 has an extended position extending outside of the perimeter of the compartment door assembly 38 and a retracted position retracted within the perimeter of the compartment door assembly 38. The elongated recess 82 may be provided with an opening 88 proximate the distal end 80 of the retractable latch plunger 76, whereby the opening 88 is essentially flush with the edge 54 of the closable door panel 58 of the storage compartment door assembly 38. The retractable latch plunger 76 may also include an offset portion 90, upon which plunger cam arm end 128 of the plunger cam 122 may be operably coupled, such that the operation of the plunger cam 122 displaces the plunger cam arm end 128 and thereby retracts the retractable latch plunger 76 to a retracted position within the elongated recess 82 disposed on the interior surface 85 of the outer housing 72, as further discussed below.

The elongated recess 82 preferably includes a first spring seat 96 at a first end 98 of the elongated recess 82 and the main body 86 of the retractable latch plunger 76 preferably includes a second spring seat 100, whereby a resilient member 102 may be mounted within the inner housing to urge and bias the retractable latch plunger 76 to the extended position. Preferably, the resilient member 102 comprises a compression spring 102 disposed in axial alignment with the retractable latch plunger 76 within the elongated recess 82, such that the compression spring 102 is disposed between the first spring seat 96 and the second spring seat 100.

Figure 4:
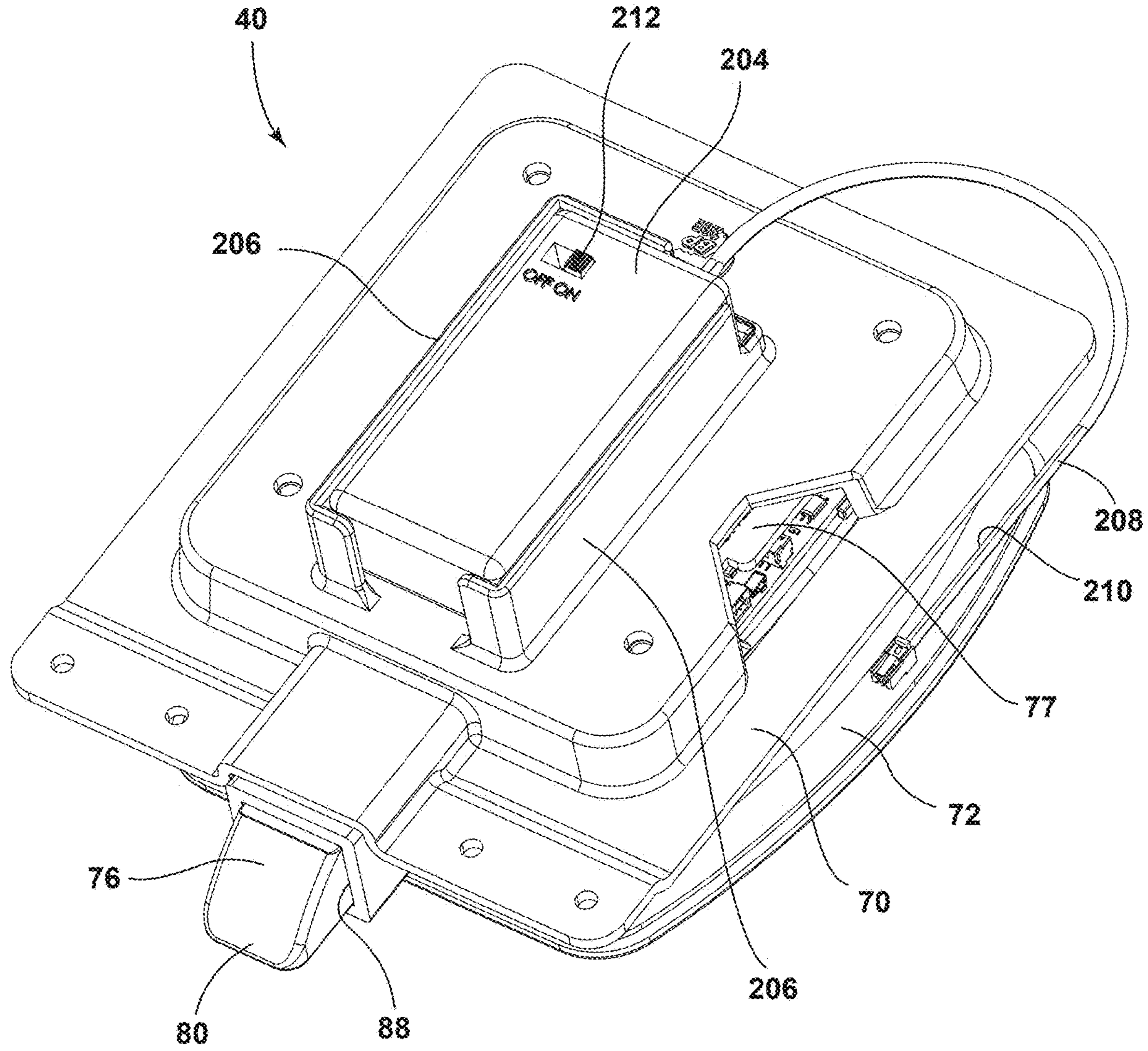
FIG. 4 is an interior perspective view of the door latch assembly of the first embodiment of the door latch assembly shown in FIG. 2.
Figure 5:
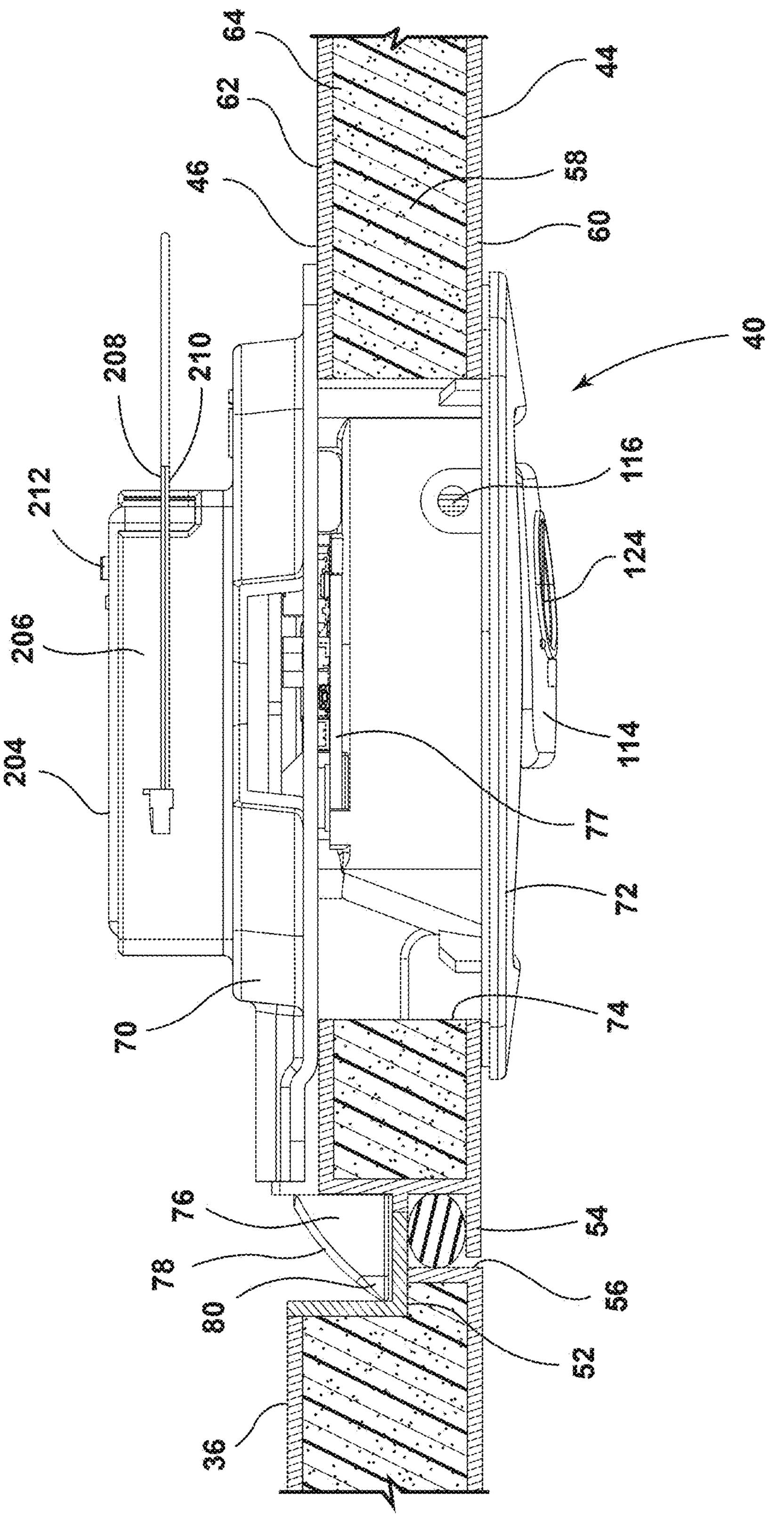
FIG. 5 is a side, partial sectional view of the door latch assembly of the first embodiment of the door latch assembly shown in FIG. 4, shown installed in the storage compartment door assembly.
Figure 6:
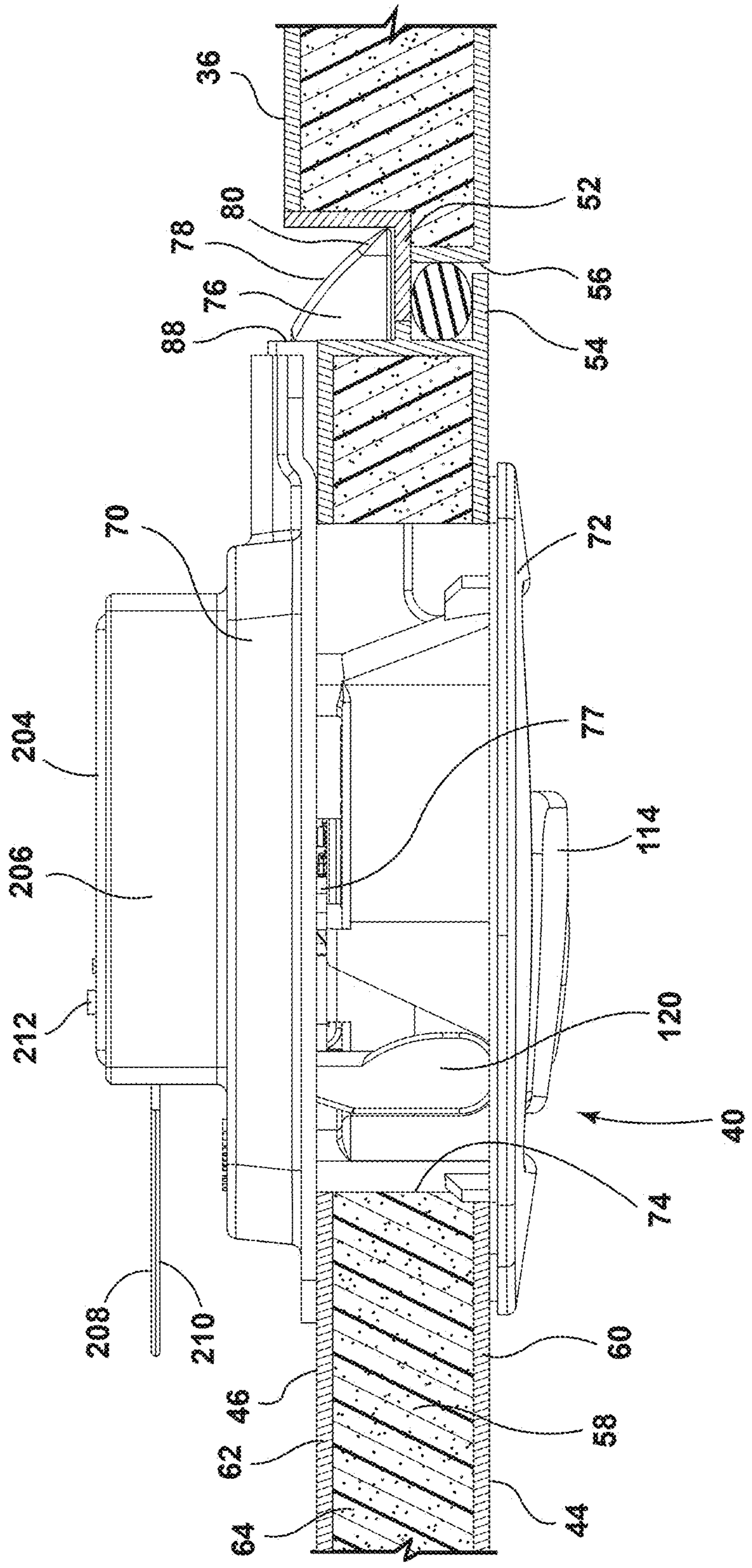
FIG. 6 is another side, partial sectional view of the door latch assembly of the first embodiment of the door latch assembly shown in FIG. 4, shown installed in the storage compartment door assembly.
Figure 7:
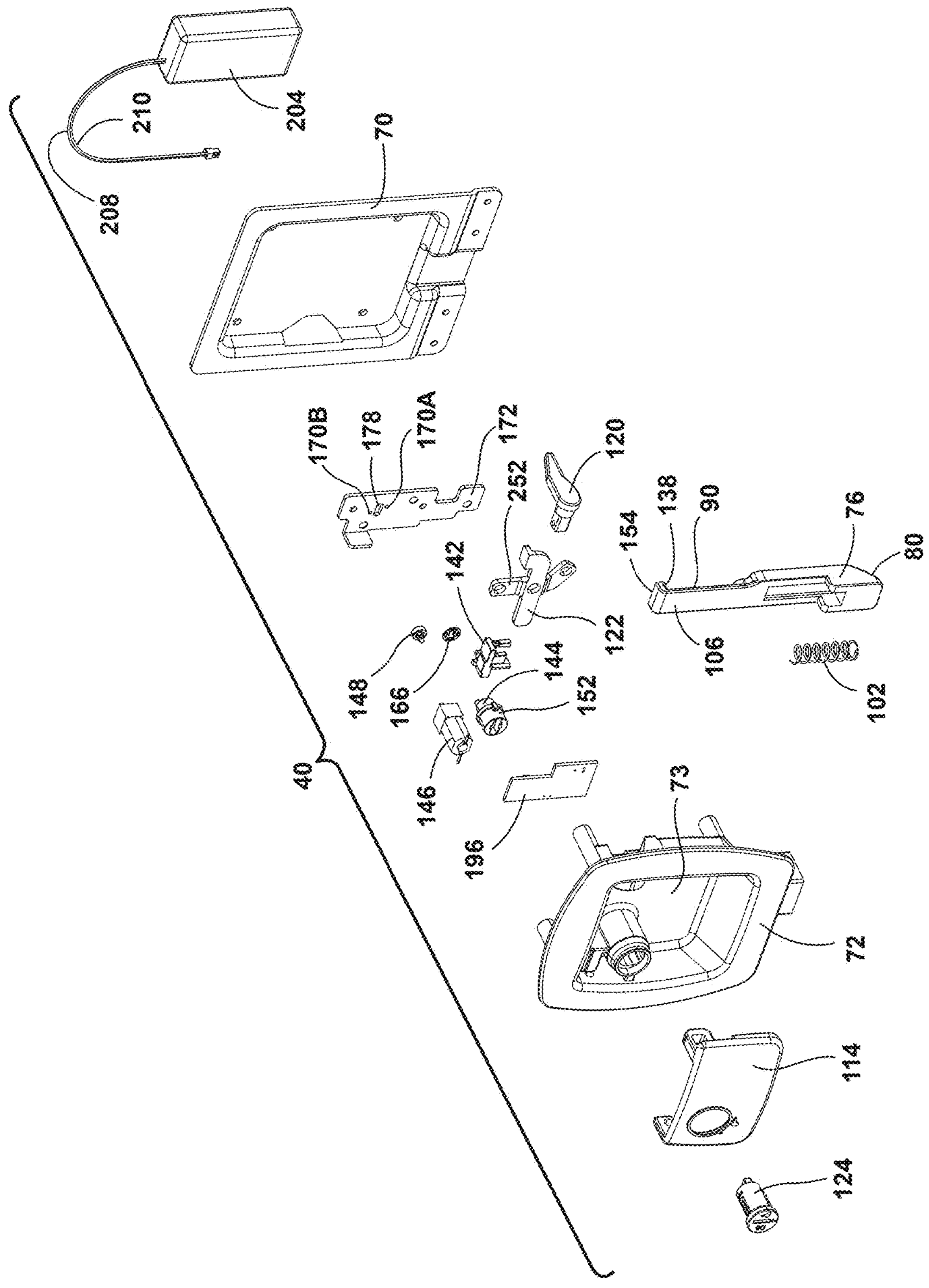
FIG. 7 is an exterior exploded view of the door latch assembly of the first embodiment of the door latch assembly shown in FIG. 2.
Figure 8:
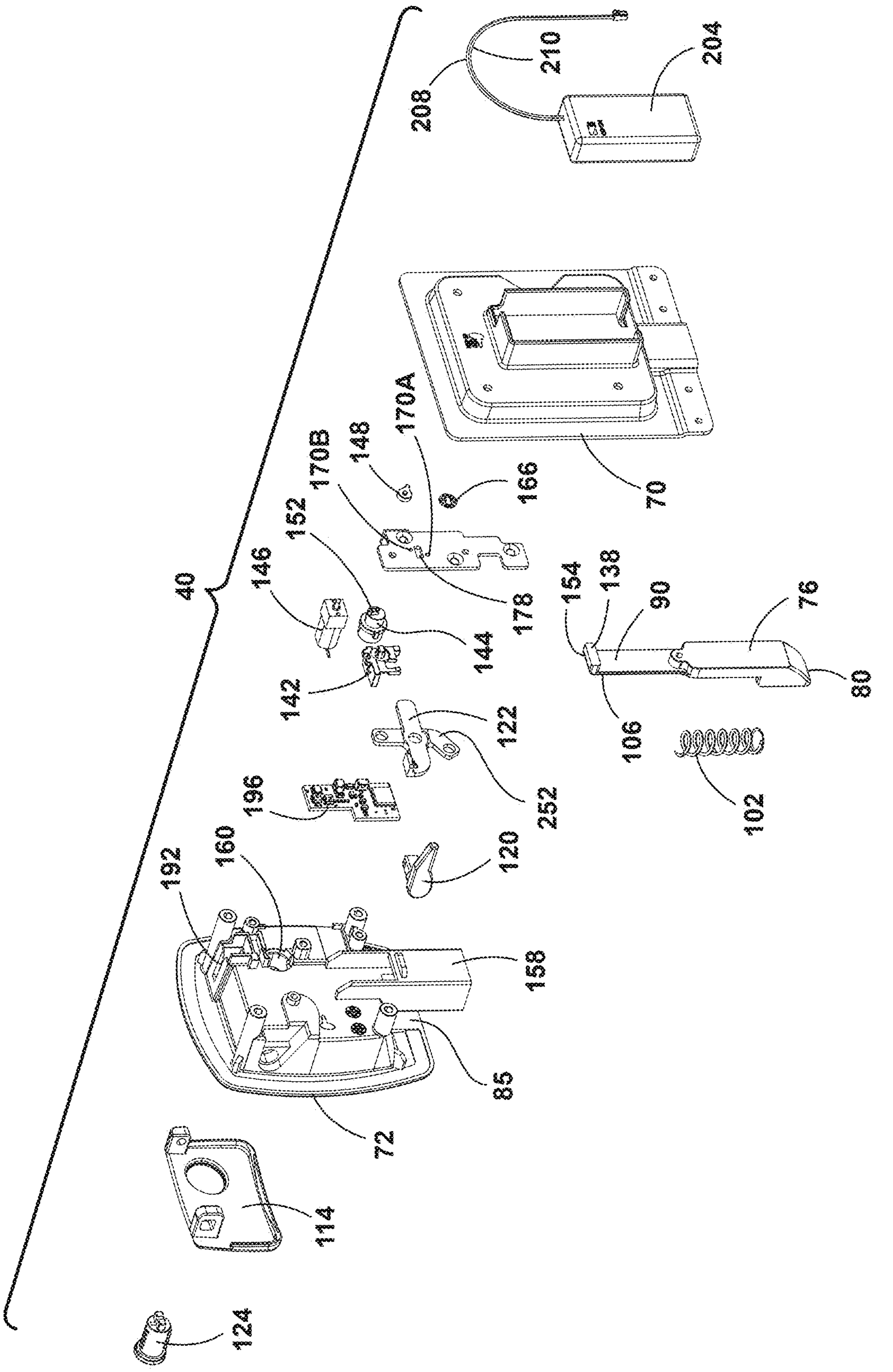
FIG. 8 is an interior exploded view of the door latch assembly of the first embodiment of the door latch assembly shown in FIG. 2.
Figure 9:
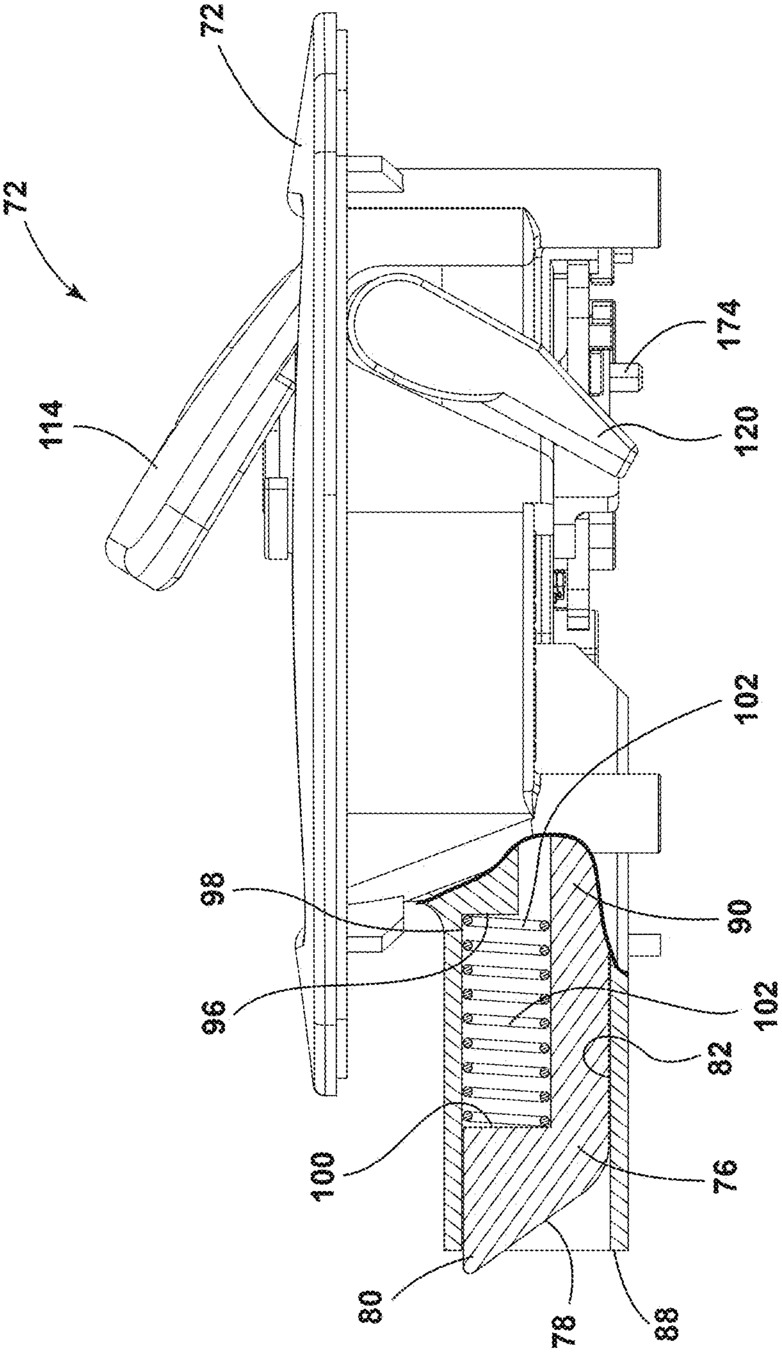
FIG. 9 is a side, partial sectional view of the outer housing of the door latch assembly of the first embodiment of the door latch assembly shown in FIG. 2, shown in the unlocked and open condition.
Figure 10:
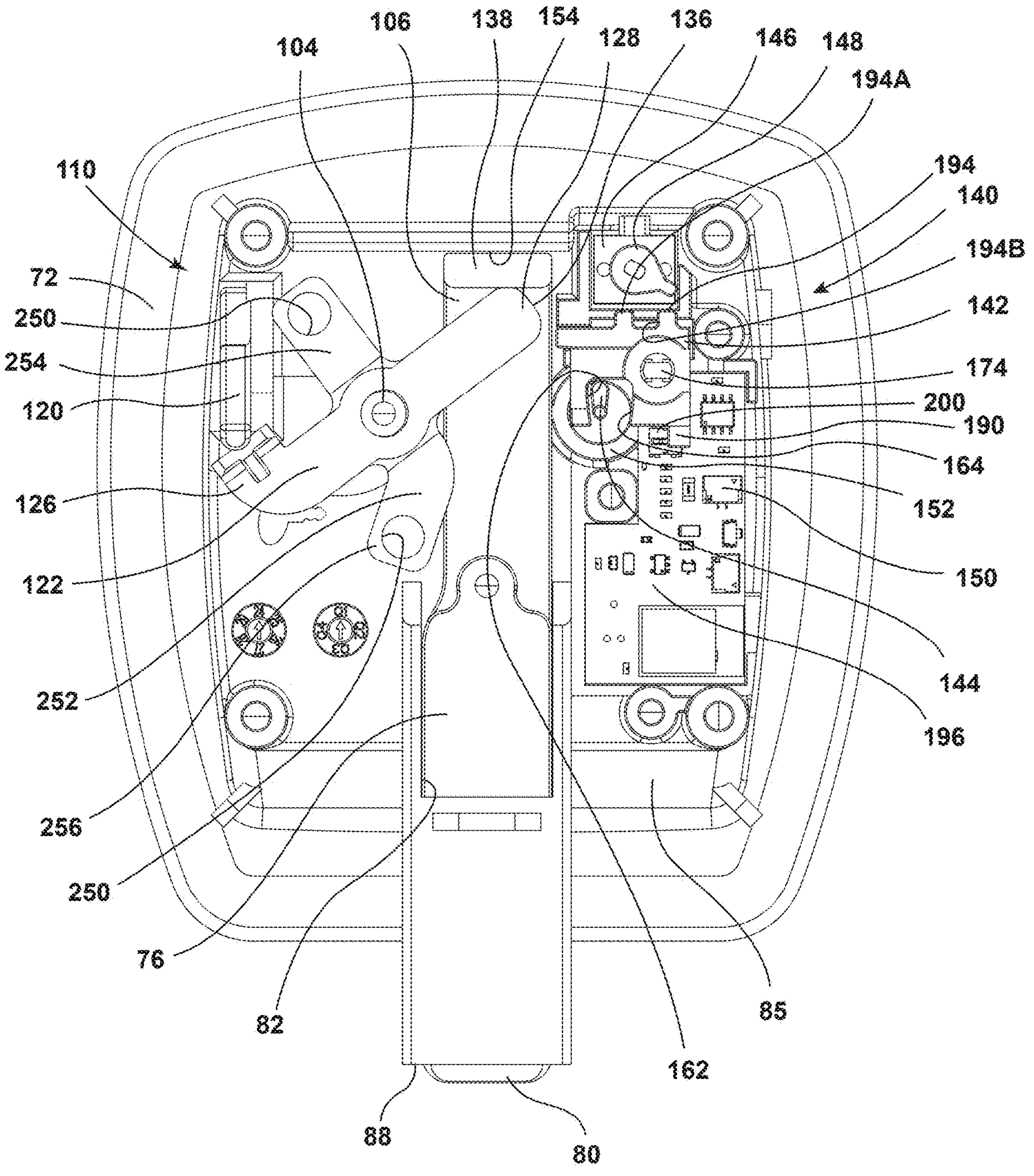
FIG. 10 is an internal plan view of the door latch assembly of the first embodiment of the door latch assembly shown in FIG. 2, with the retractable latch plunger shown in the unlocked and open condition.
Figure 12:
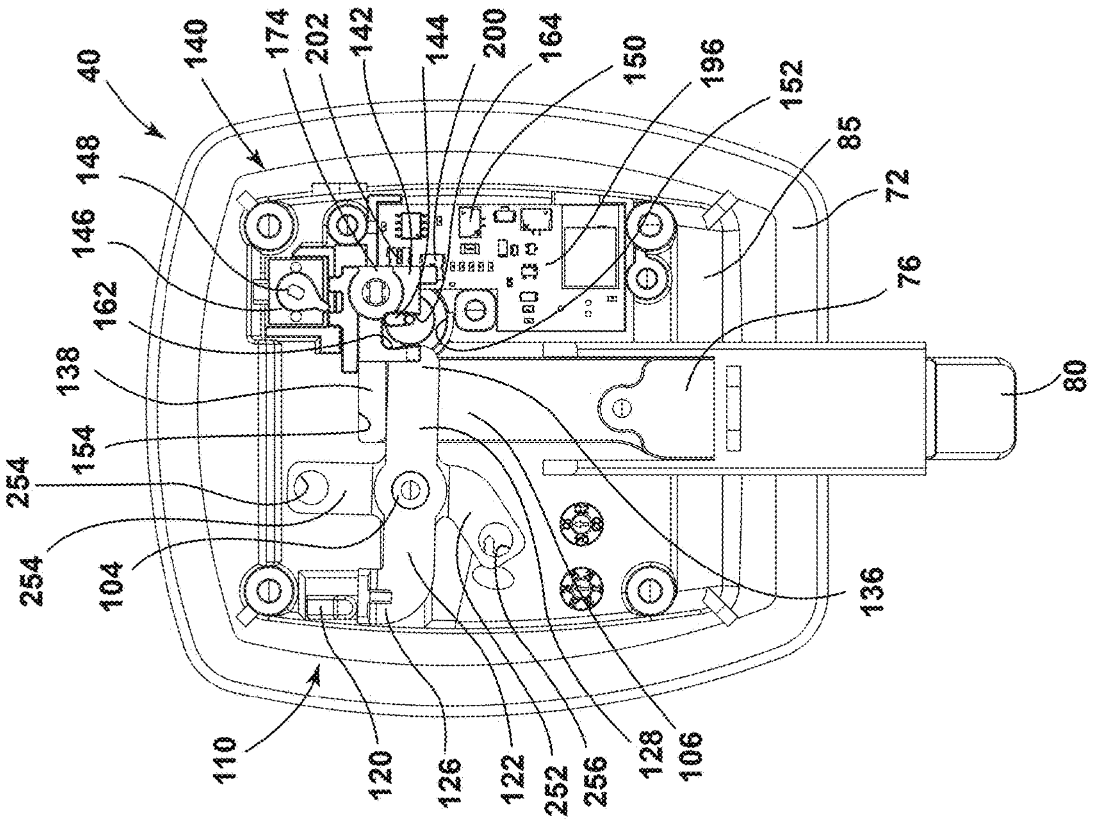
FIG. 12 is an internal plan view of the door latch assembly of the first embodiment of the door latch assembly shown in FIG. 2, with the retractable latch plunger shown in the locked condition.
Figure 11:
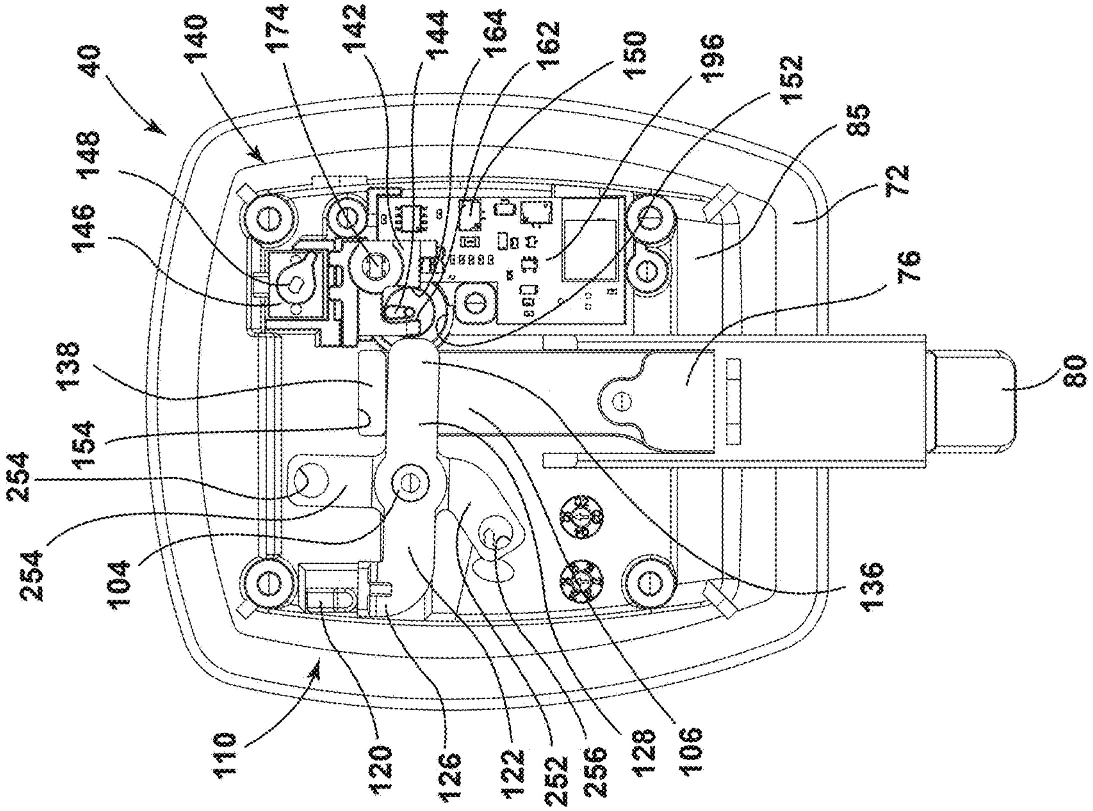
FIG. 11 is an internal plan view of the door latch assembly of the first embodiment of the door latch assembly shown in FIG. 2, with the retractable latch plunger shown in the unlocked condition.
Figure 14:
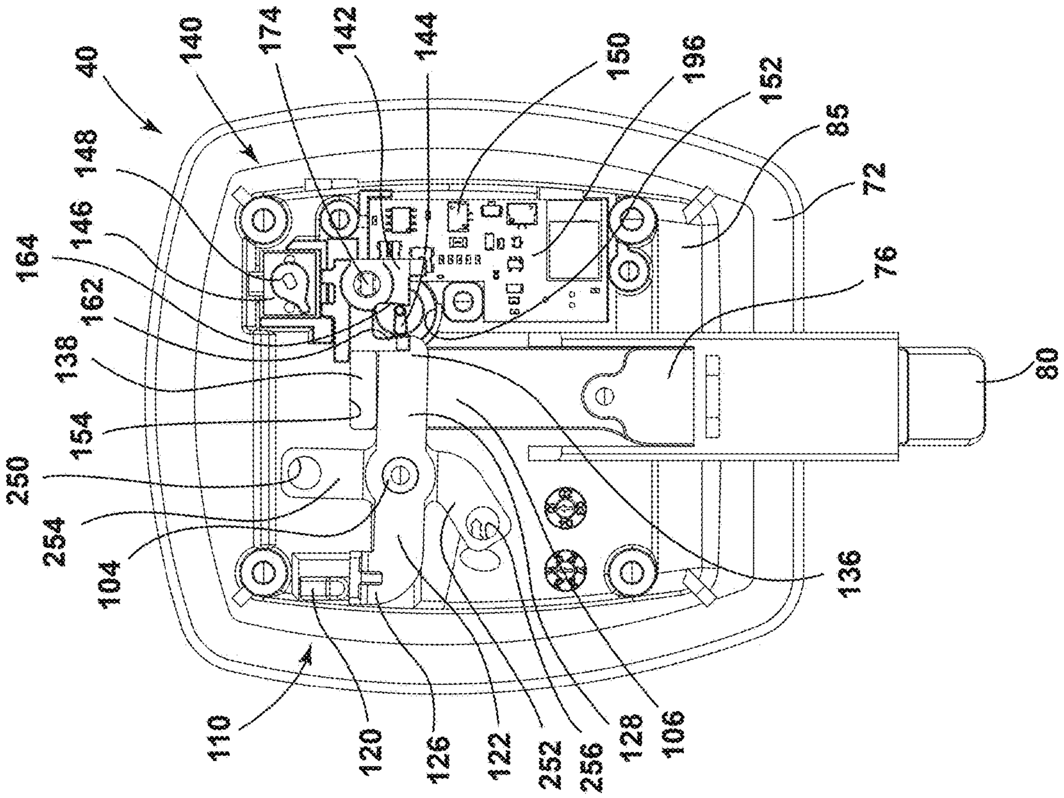
FIG. 14 is an internal plan view of the door latch assembly of the first embodiment of the door latch assembly shown in FIG. 2, with the retractable latch plunger shown in the locked condition and the lock bolt driver in the locking position.
Figure 13:
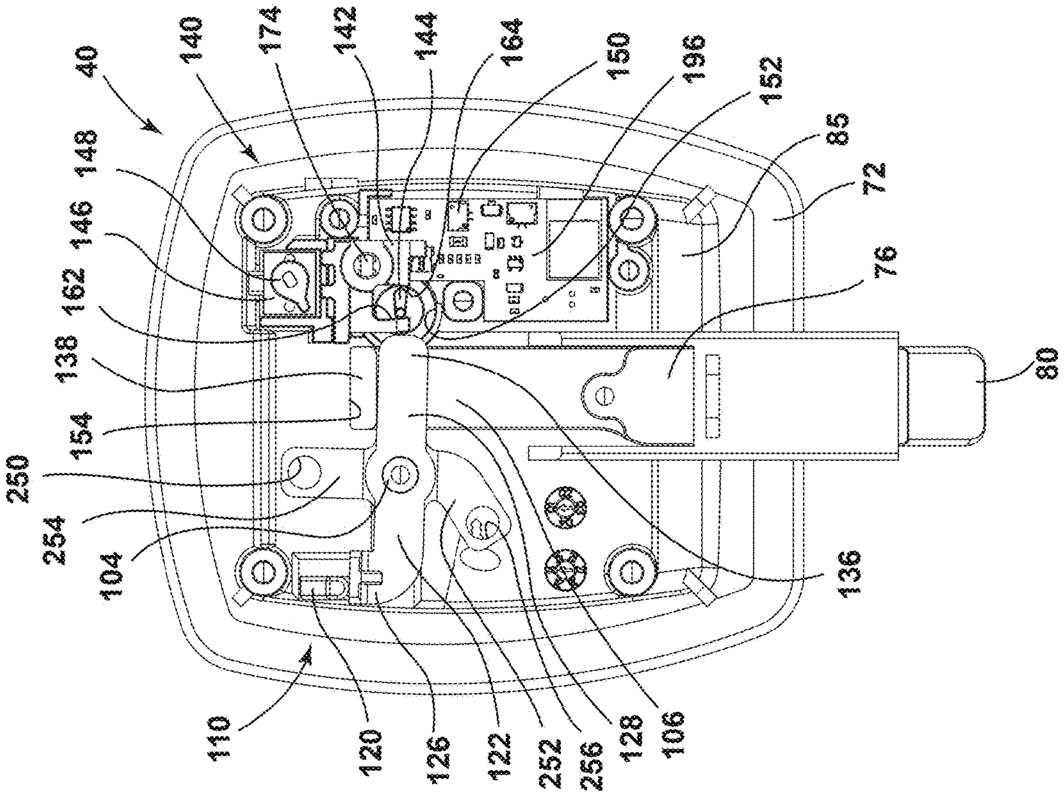
FIG. 13 is an internal plan view of the door latch assembly of the first embodiment of the door latch assembly shown in FIG. 2, with the retractable latch plunger shown in the unlocked condition and the lock bolt driver in the unlocking position.
Figure 16:
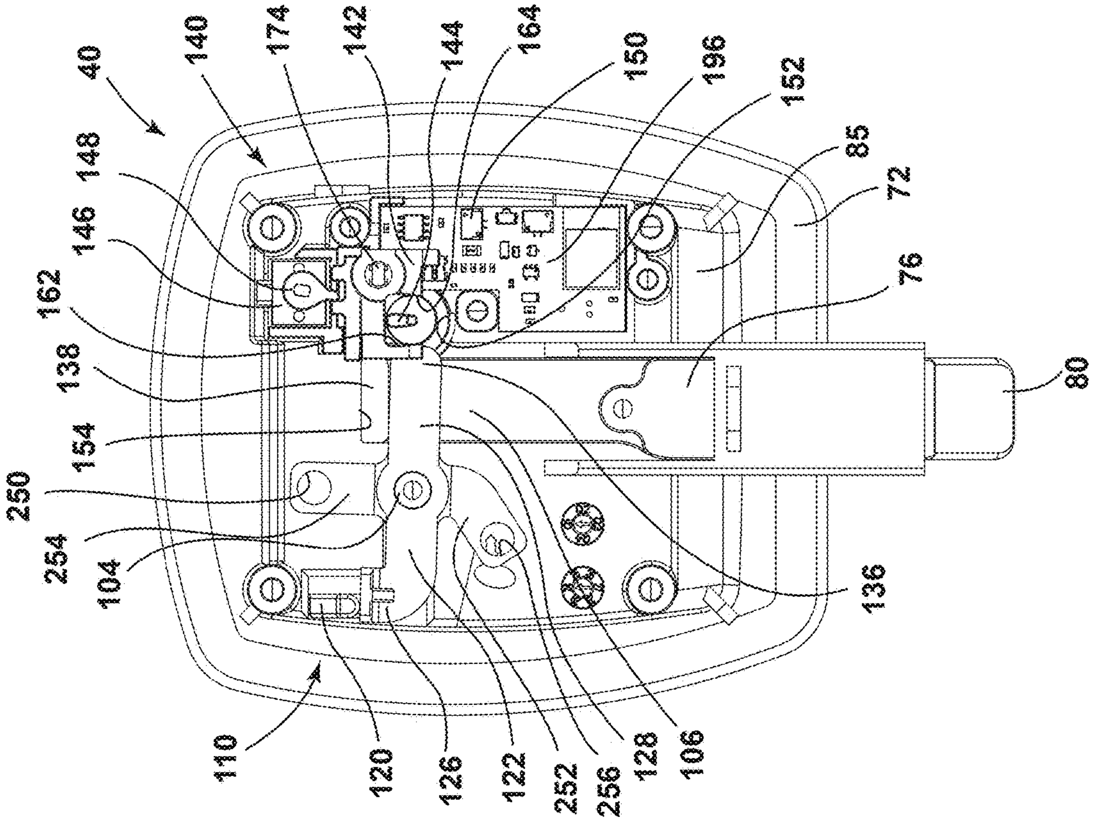
FIG. 16 is an internal plan view of the door latch assembly of the first embodiment of the door latch assembly shown in FIG. 2, with the retractable latch plunger shown in the locked condition and the motor actuator in the locking position.
Figure 15:
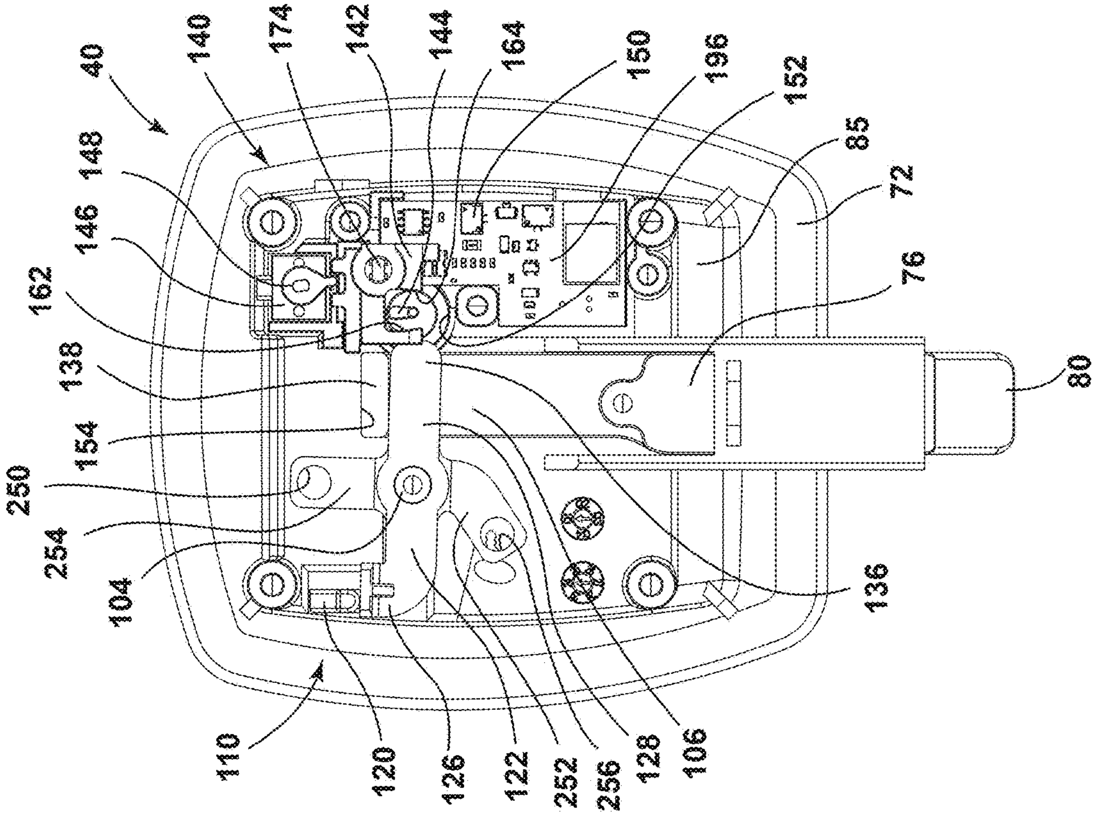
FIG. 15 is an internal plan view of the door latch assembly of the first embodiment of the door latch assembly shown in FIG. 2, with the retractable latch plunger shown in the unlocked condition and the motor actuator in the unlocking position.

The retractable latch plunger 76 is thus readily displaced to its retracted position by contact of the inclined surface 78 at its exposed distal end 80 with the latch striker 52 mounted to the recreational vehicle proximate the opening 56 for the storage compartment door assembly 38, as best shown in FIG. 4. Thus, as noted above, the storage compartment door assembly 38 so equipped with the door latch assembly 40 can be closed without manual retraction of the retractable latch plunger 76 and may be simply "slammed" shut.

As shown in FIGS. 10-16 and 26-32, a plunger actuator 110 may be operably coupled with the retractable latch plunger 76. As shown in FIGS. 7, 8, 21, and 22, the plunger actuator 110 may include the manually actuated exterior latch paddle handle 114 rotatably mounted to the exterior or outer face of the outer housing and within the paddle recess of the outer housing by pivot pin 116, the paddle cam 120 operably coupled with the exterior latch paddle handle 114, and the plunger cam 122 rotatably mounting and operably coupled with the paddle cam 120 and the retractable latch plunger 76, whereupon actuation of the exterior latch paddle handle 114 from a closed position to an open position displaces the paddle cam 120 and rotates the plunger cam 122 to displace the retractable latch plunger 76 from the extended position to the retracted position against the urging of the resilient member 102. The plunger cam 122, which is operably connected to the paddle cam 120 and the retractable latch plunger 76, retracts the retractable latch plunger 76 when the exterior latch paddle handle 114 is actuated/opened. The plunger cam 122 likewise returns the exterior latch paddle handle 114 to its normally closed position when the retractable latch plunger 76 is extended.

The plunger cam 122 may include a paddle cam arm end 126 in juxtaposed relation to the paddle cam 120, a plunger cam arm end 128 in juxtaposed relation to the retractable latch plunger 76, and a pivot 104 disposed between the paddle cam arm end 126 and the plunger cam arm end 128 about which the plunger cam 122 is adapted to rotate. The plunger cam arm end 128 of the plunger cam 122 may have a curvilinear shape about a distal end 136 thereof that is adapted for sliding movement relative a bearing surface of a plunger tab 138 disposed at a proximal end 106 of the retractable latch plunger 76 and engaged by the plunger cam arm end 128 of the plunger cam 122 during rotation of the plunger cam 122. In addition, or alternatively, the bearing surface of the plunger tab 138 at the proximal end 106 of the retractable latch plunger 76 may also have a curvilinear shape. In the first embodiment shown in FIGS. 10-16, the paddle cam arm end 126 and the plunger cam arm end 128 may be co-linear. In the second embodiment shown in FIGS. 17-32, the paddle cam arm end 126 and the plunger cam arm end 128 may be offset.

Thus, upward rotation of the exterior latch paddle handle 114 from a closed position to an open position displaces the paddle cam 120, which depresses the paddle cam arm end 126 on the plunger cam 122, thereby rotating the plunger cam 122. As noted above, such rotation of the plunger cam 122 displaces a plunger cam arm end 128 of the plunger cam 122 and retracts the proximal end 106 of the retractable latch plunger 76 to a retracted position within the elongated recess 82, whereby the retractable latch plunger 76 may be shifted from the latched position to its unlatched position. Upon shifting the retractable latch plunger 76 to its unlatched position, the recreational vehicle storage compartment door assembly 38 may be readily shifted to its open position.

The resilient member 102 also serves to return the exterior latch paddle handle 114 to the closed position when released by the operator, whereby when the retractable latch plunger 76 returns to its extended position within the elongated recess 82 disposed to within the inner housing 70 by the urging of the compression spring 102, the retractable latch plunger 76 urges the exterior latch paddle handle 114 to its closed position.

If the storage compartment door assembly 38 so equipped is in the open position, it may now be simply "slammed" shut. If the storage compartment door assembly 38 so equipped is in the closed position, the distal end 80 of the retractable latch plunger 76 is disposed adjacent the latch striker 52, as shown in FIGS. 5-6 and 19-20, and the storage compartment door assembly 38 is maintained in the closed position.

Figure 3:
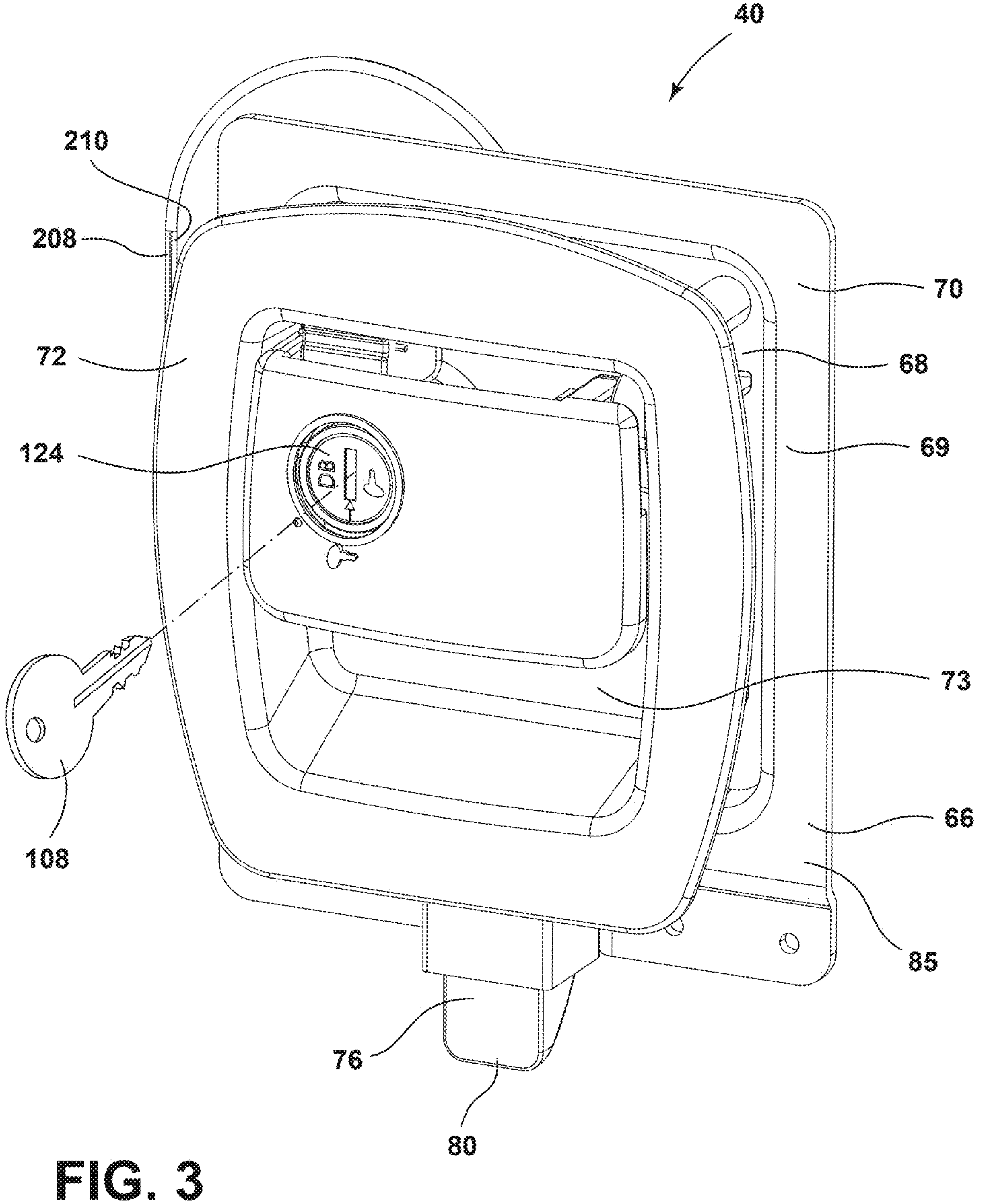
FIG. 3 is an exterior perspective view of the door latch assembly of a first embodiment of the door latch assembly shown in FIG. 2.
Figure 18:
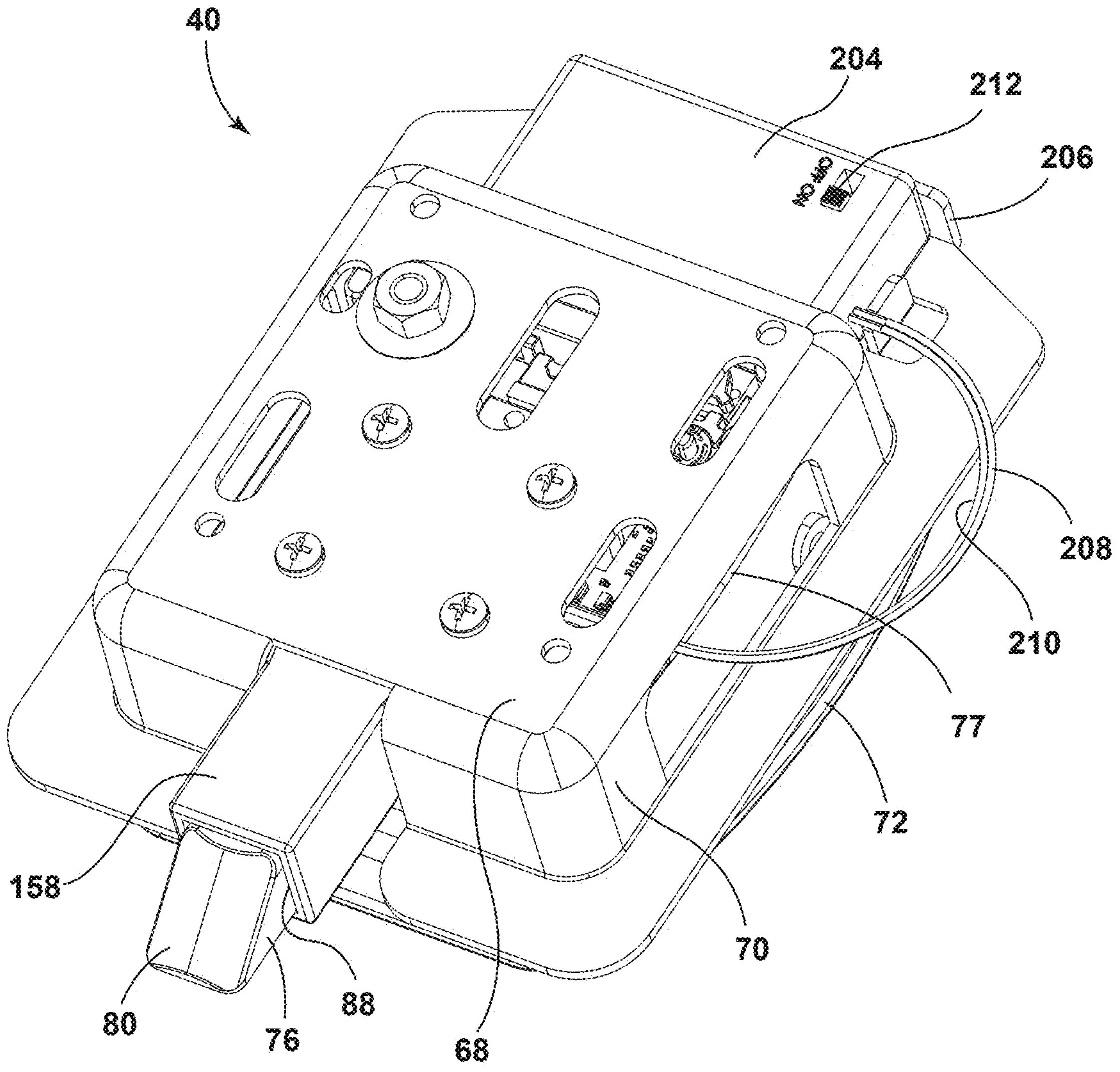
FIG. 18 is an interior perspective view of the door latch assembly of the second embodiment of the door latch assembly shown in FIG. 2.
Figure 19:
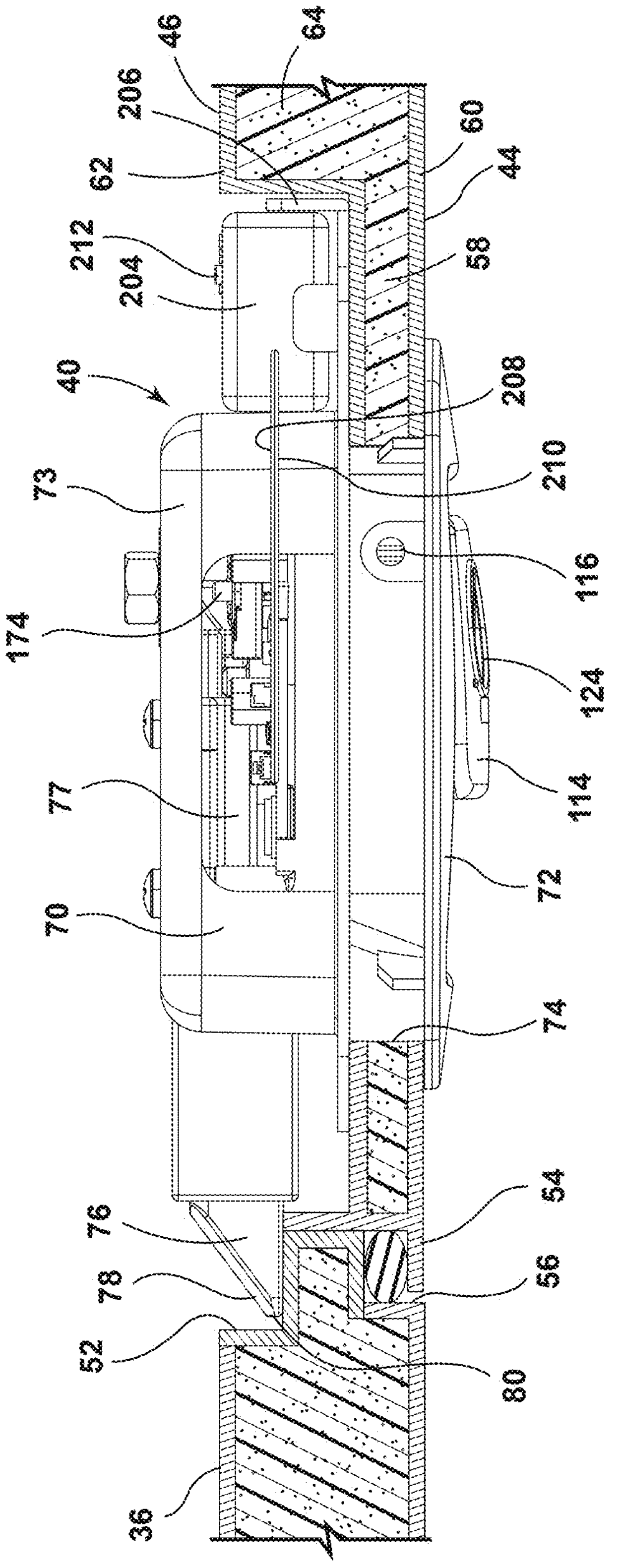
FIG. 19 is a side, partial sectional view of the door latch assembly of the second embodiment of the door latch assembly shown in FIG. 4, shown installed in the storage compartment door assembly.
Figure 20:
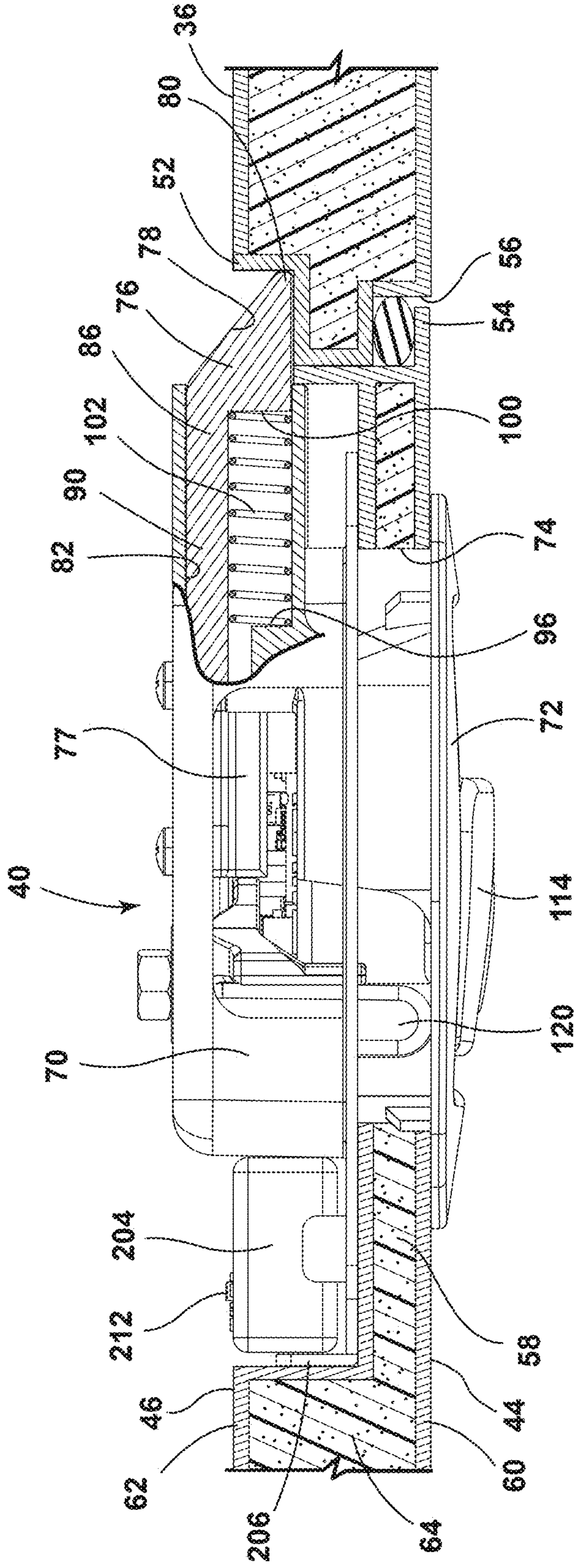
FIG. 20 is another side, partial sectional view of the door latch assembly of the second embodiment of the door latch assembly shown in FIG. 4, shown installed in the storage compartment door assembly.
Figure 21:
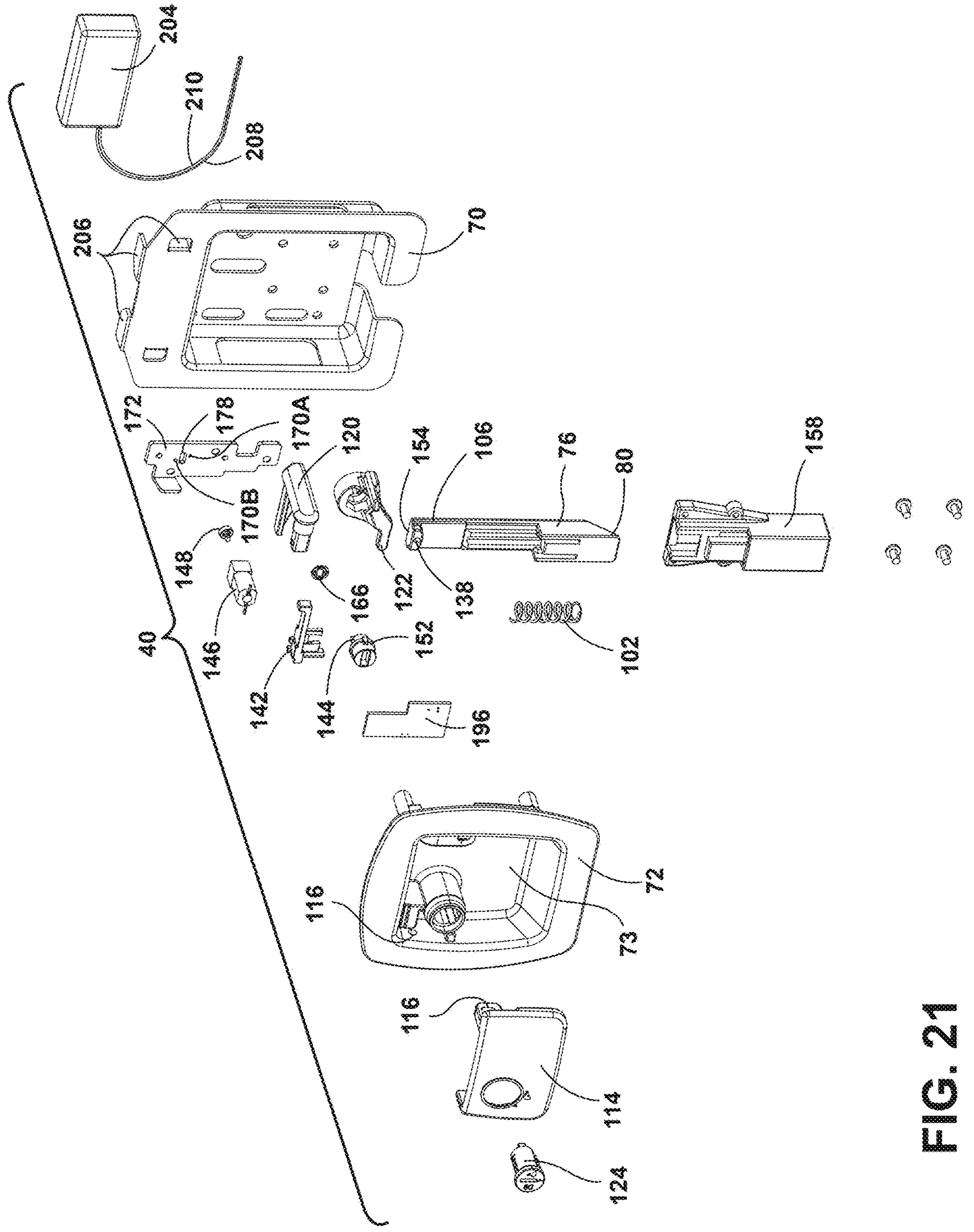
FIG. 21 is an exterior exploded view of the door latch assembly of the second embodiment of the door latch assembly shown in FIG. 2.
Figure 22:
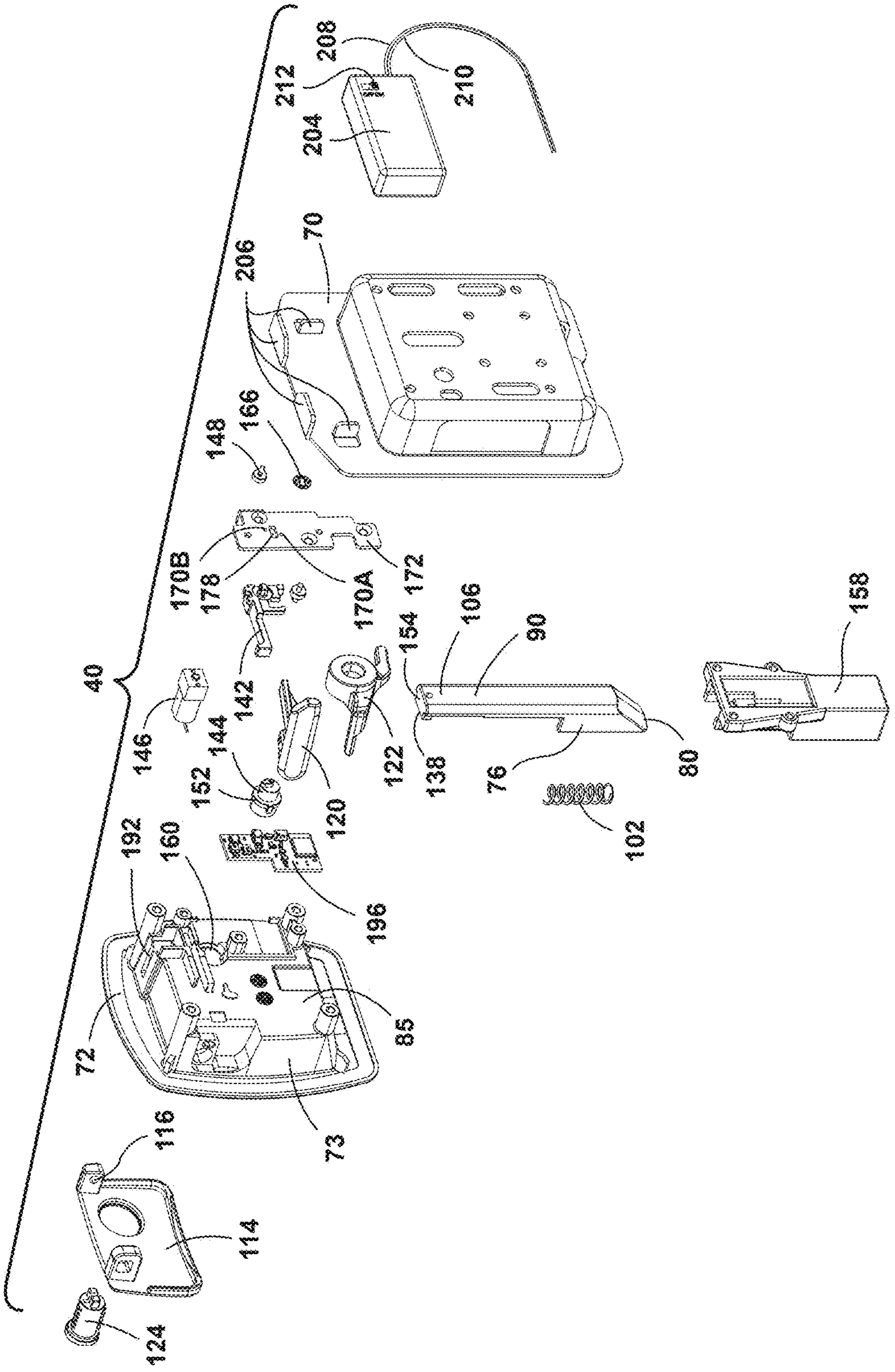
FIG. 22 is an interior exploded view of the door latch assembly of the second embodiment of the door latch assembly shown in FIG. 2.
Figure 23A:
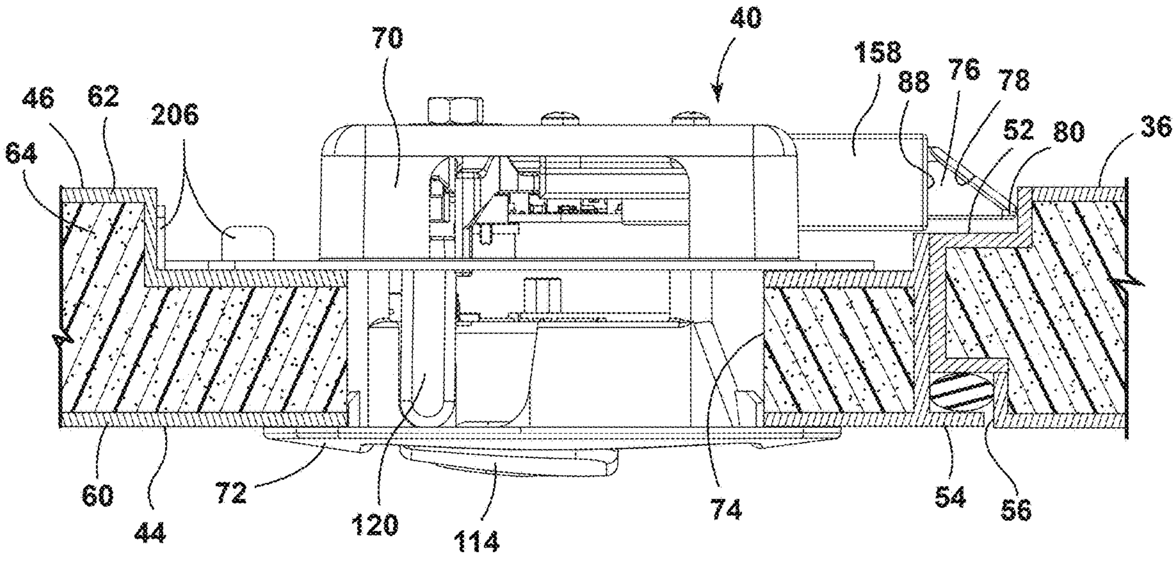
FIG. 23A is a side, partial sectional view of the door latch assembly of the second embodiment of the door latch assembly shown in FIG. 2, shown installed in a storage compartment door assembly having a first thickness.
Figure 23B:
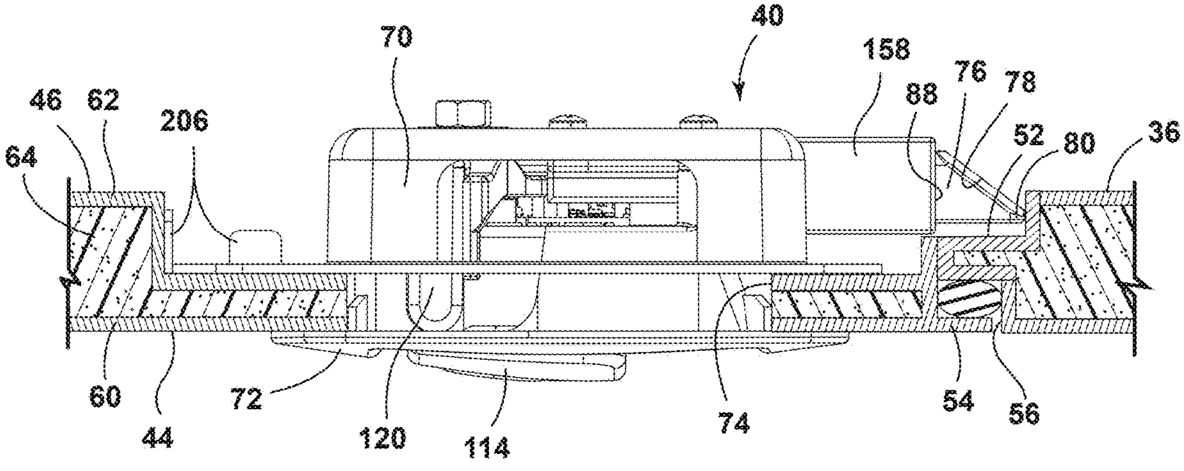
FIG. 23B is a side, partial sectional view of the door latch assembly of the second embodiment of the door latch assembly shown in FIG. 2, shown installed in a storage compartment door assembly having a second thickness thinner than the first thickness.
Figure 24:
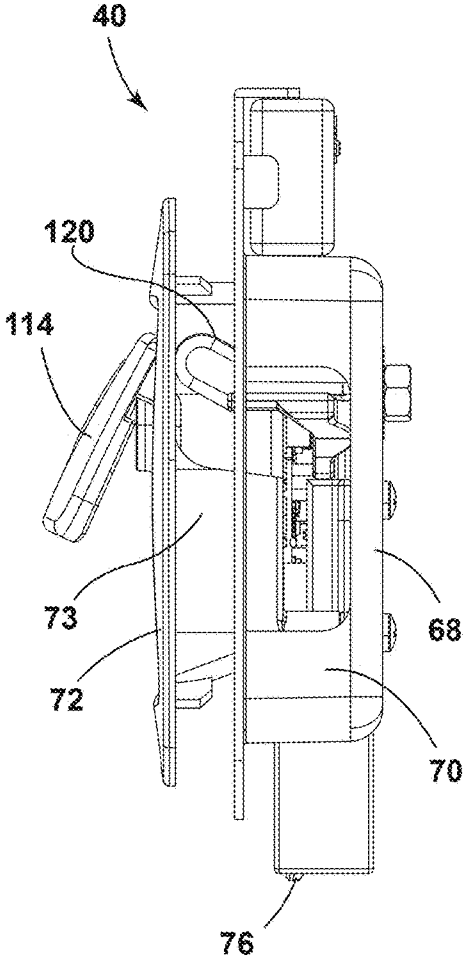
FIG. 24 is a side view of the door latch assembly of the second embodiment of the door latch assembly shown in FIG. 2, shown in the unlocked and open condition.
Figure 25:
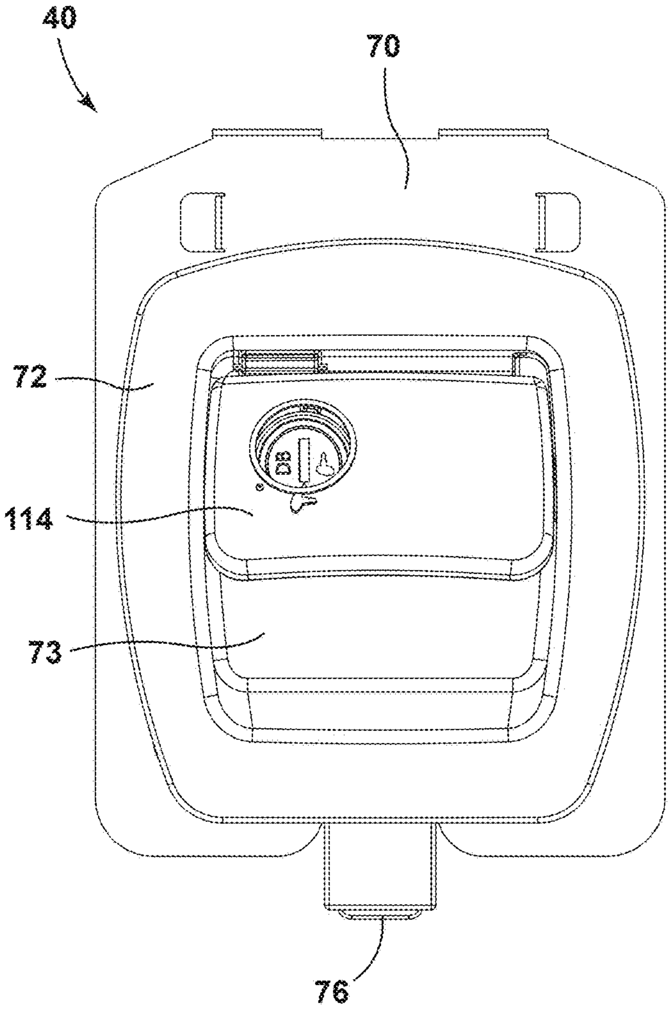
FIG. 25 is a external plan view of the door latch assembly of the second embodiment of the door latch assembly shown in FIG. 2, shown in the unlocked and open condition.
Figure 26:
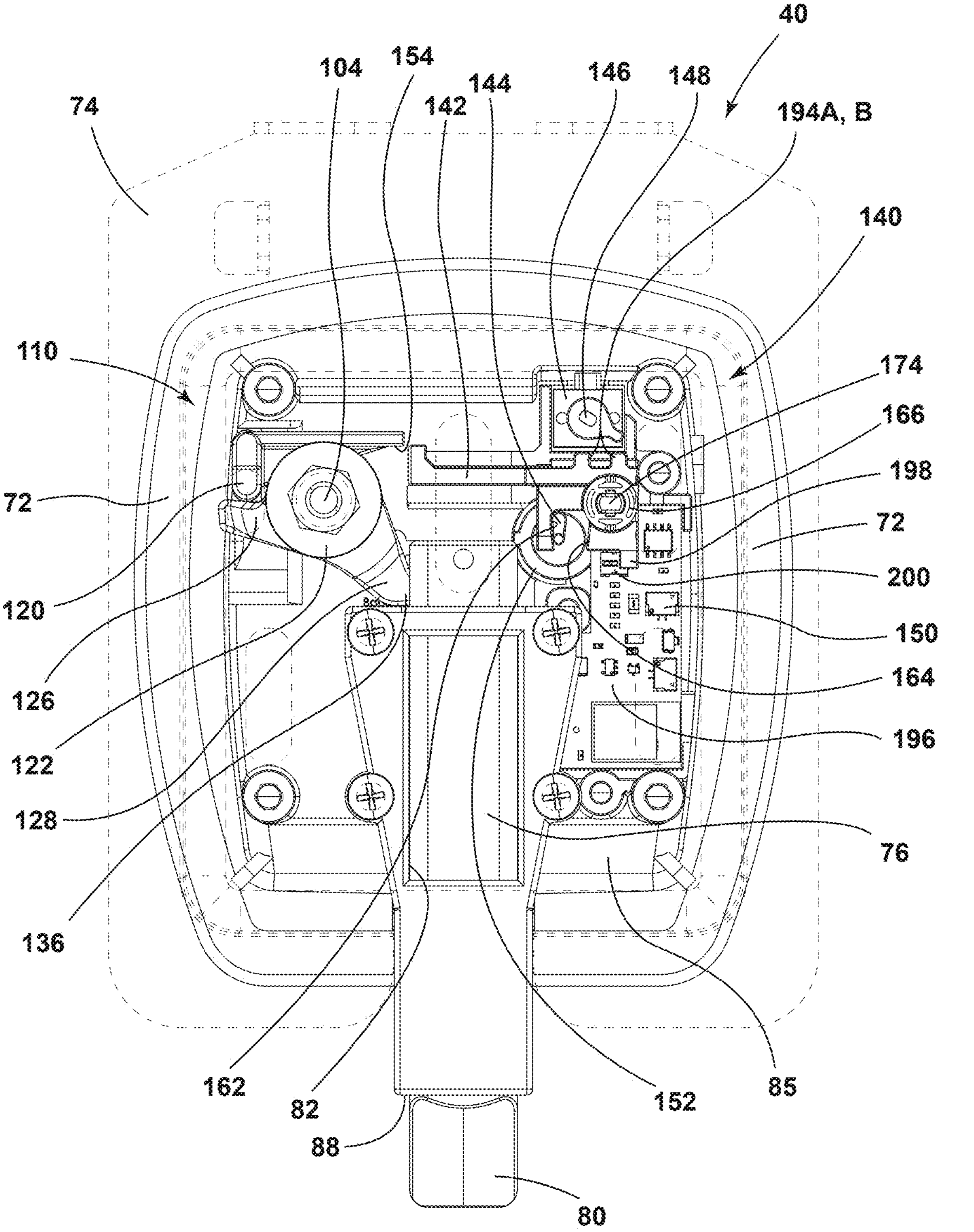
FIG. 26 is an internal plan view of the door latch assembly of the second embodiment of the door latch assembly shown in FIG. 2, shown in the unlocked and closed condition.
Figure 27:
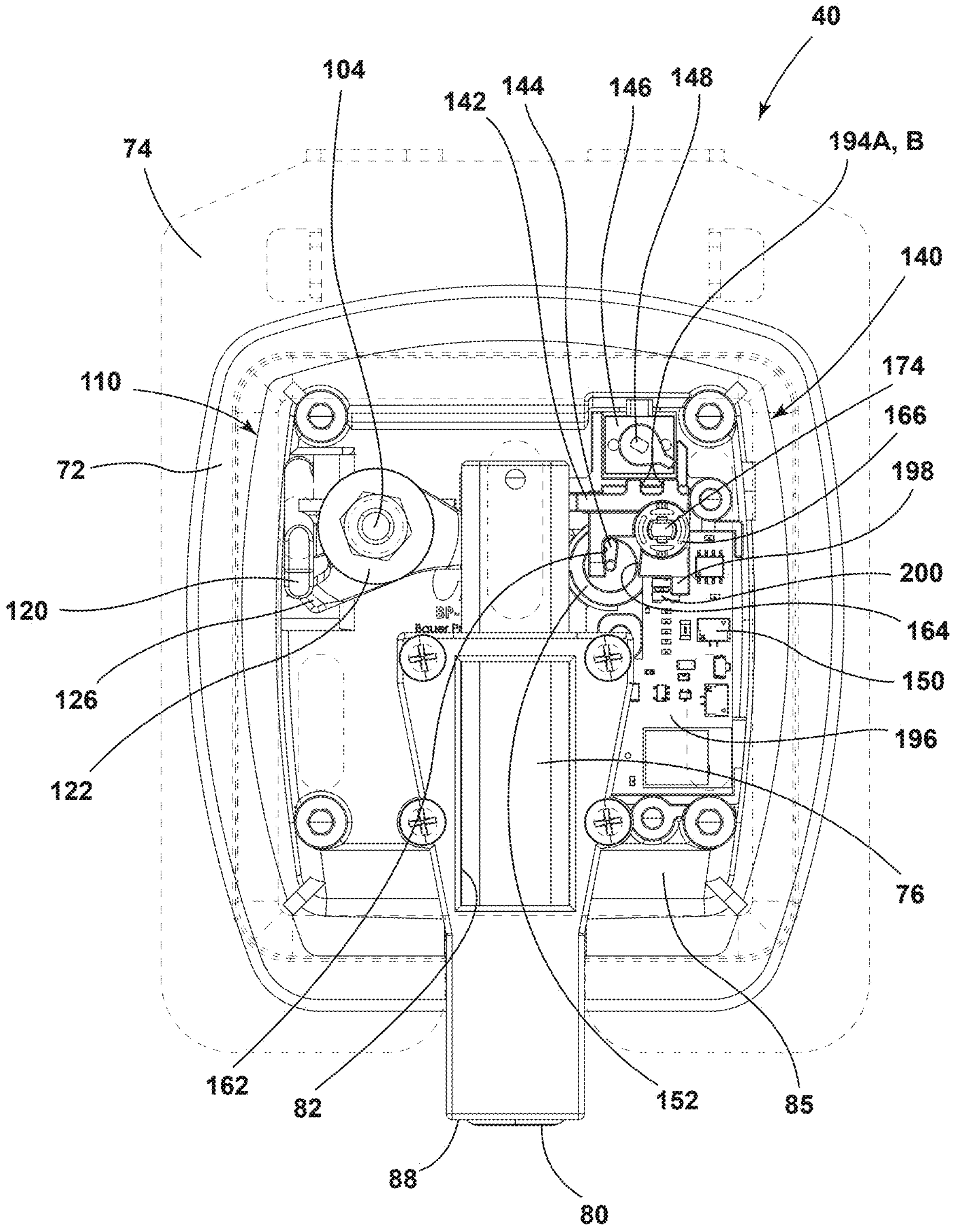
FIG. 27 is an internal plan view of the door latch assembly of the second embodiment of the door latch assembly shown in FIG. 2, shown in the unlocked and open condition.

The slam door latch assembly 40 may also include a locking mechanism 140 that may include a lock cylinder 124 that is situated to restrain the exterior latch paddle handle 114 when in the locked condition and thus prevent operation of the retractable latch plunger 76 for maximum security, as shown in FIGS. 10-16 and 26-32. The lock cylinder 124 may be integrated into the outer housing 72, as shown in FIGS. 3 and 18. In accordance with the present disclosure, locking mechanism 140 may also include a lock bolt 142, a lock bolt driver 144, an electrically actuated motor 146, a motor actuator 148, a controller 150, and a lock bolt clutch 152.

Figure 28:
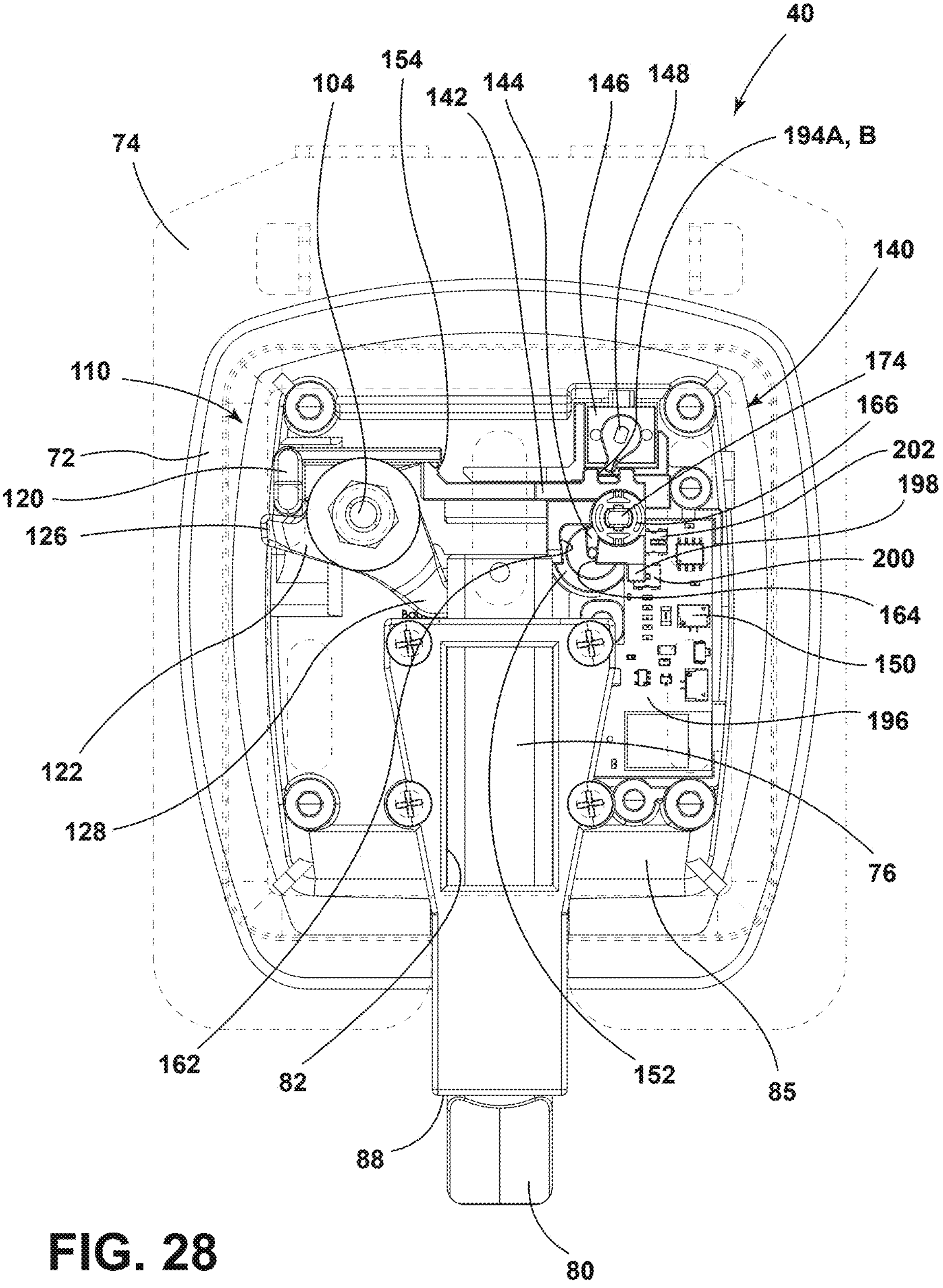
FIG. 28 is an internal plan view of the door latch assembly of the second embodiment of the door latch assembly shown in FIG. 2, shown in the locked and closed condition.
Figure 30:
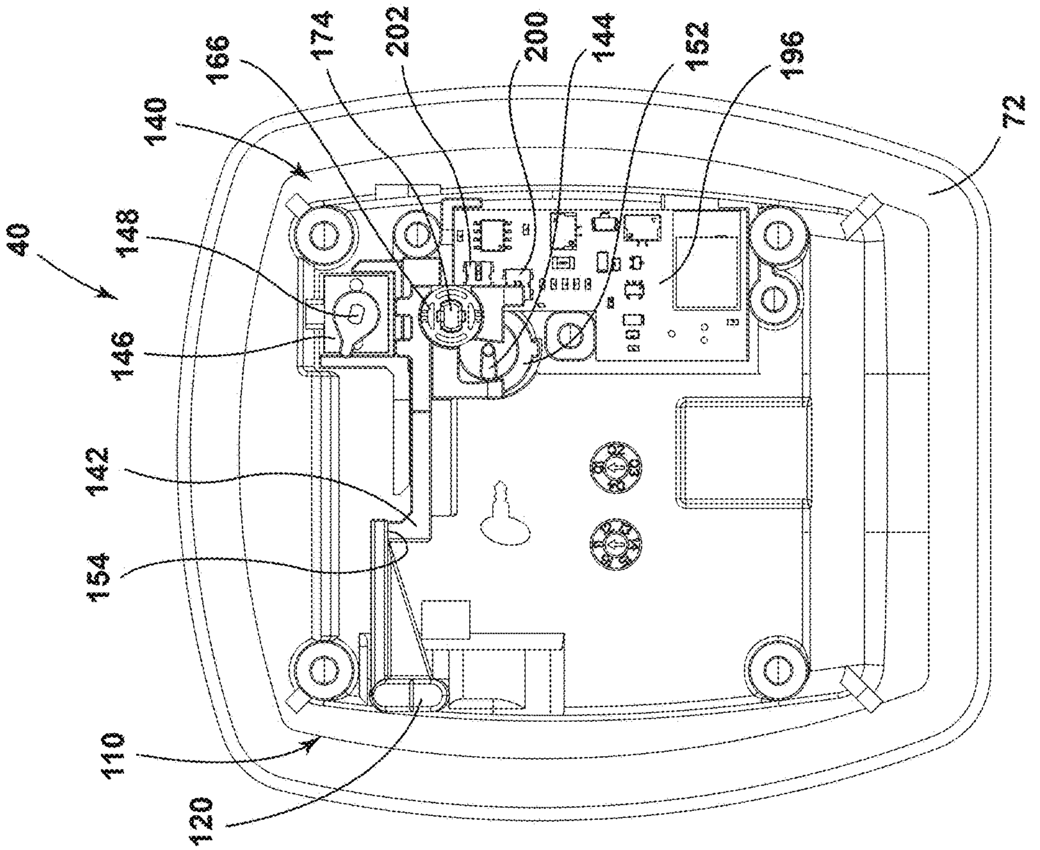
FIG. 30 is an internal plan view of the door latch assembly of the second embodiment of the door latch assembly shown in FIG. 2, with the paddle cam shown in the locked condition and the lock bolt driver in the locking position.
Figure 29:
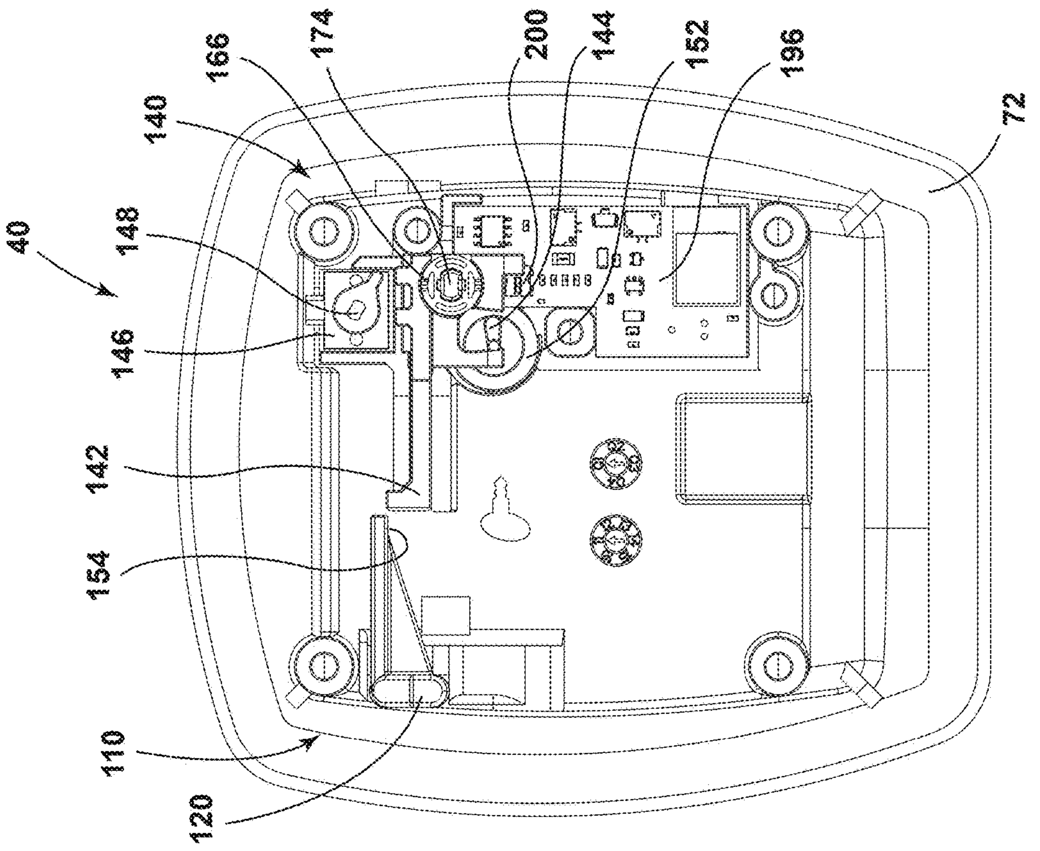
FIG. 29 is an internal plan view of the door latch assembly of the second embodiment of the door latch assembly shown in FIG. 2, with the paddle cam shown in the unlocked condition and the lock bolt driver in the unlocking position.
Figure 32:
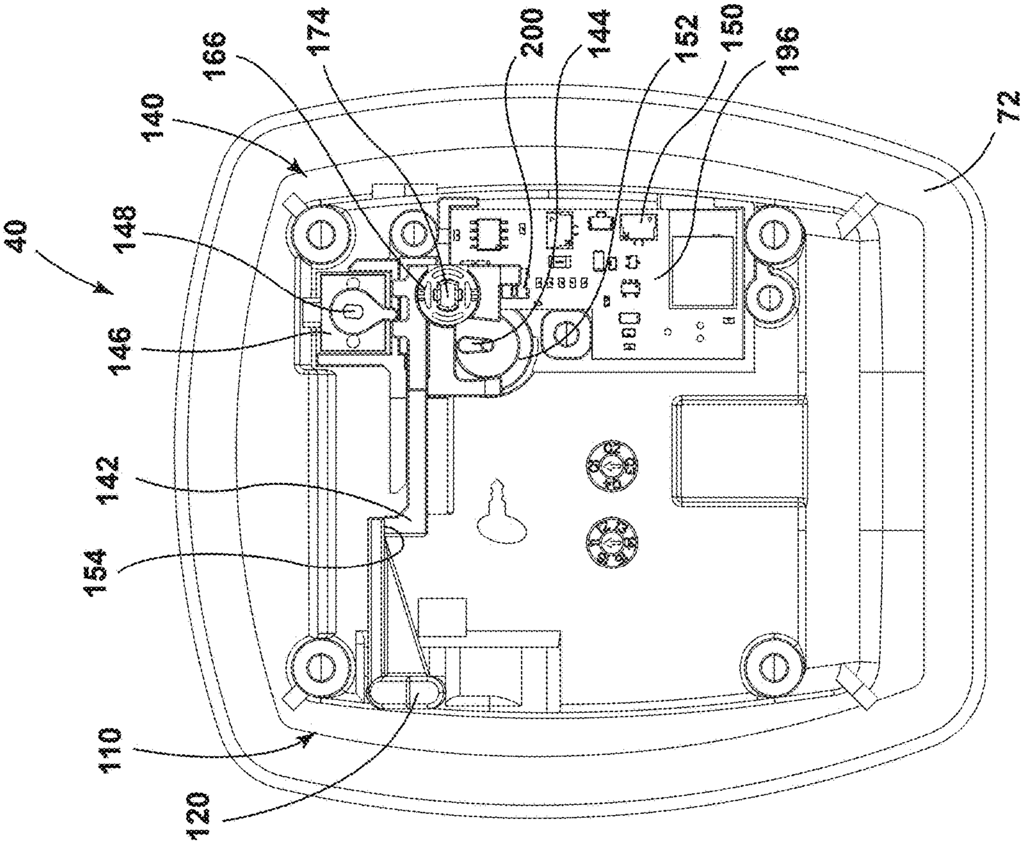
FIG. 32 is an internal plan view of the door latch assembly of the second embodiment of the door latch assembly shown in FIG. 2, with the paddle cam shown in the locked condition and the motor actuator in the locking position.
Figure 31:
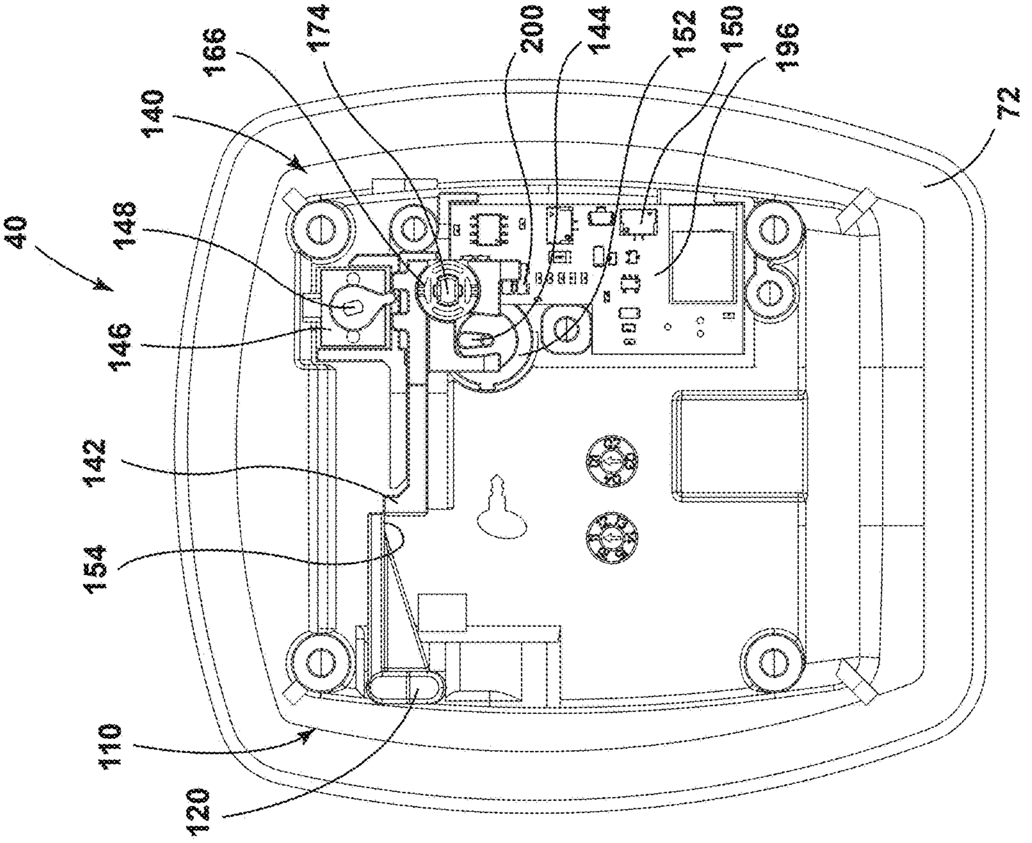
FIG. 31 is an internal plan view of the door latch assembly of the second embodiment of the door latch assembly shown in FIG. 2, with the paddle cam shown in the unlocked condition and the motor actuator in the unlocking position.

The lock bolt 142 may have a locked position and an unlocked position. The lock bolt 142 may be adapted to prevent movement of the retractable latch plunger 76 in the locked position, shown in FIGS. 12, 14, and 16, or may be adapted to prevent movement of the paddle cam 120 when in the locked position, likewise preventing movement of the retractable latch plunger 76, as shown in FIGS. 28, 30, and 32. That is, the lock bolt 142 may be adapted to directly or indirectly prevent movement of the retractable latch plunger 76, thereby locking the retractable latch plunger 76. When the lock bolt 142 is moved away from the retractable latch plunger 76 or the paddle cam 120, as further discussed below, the door latch assembly 40 may be placed in the unlocked condition, in that the exterior latch paddle handle 114 is allowed to actuate the retractable latch plunger 76, as shown in FIGS. 10, 11, 13, and 15, or the paddle cam 120 is allowed to rotate, likewise allowing movement of the retractable latch plunger 76, as shown in FIGS. 26, 27, 29, and 31.

As shown in the Figures, the lock bolt driver 144 may be disposed on the lock bolt clutch 152 which is received within a recess 160 in the outer housing 72 and may be operably coupled with the lock cylinder 124, which in turn is actuated by key 108. So situated, the lock bolt driver 144 may be selectively operably coupled with the lock bolt 142. The lock bolt clutch 152 may be integrally molded with the lock bolt driver 144 to move lock bolt 142 from the unlocked to locked position or vice versa.

Figure 17:
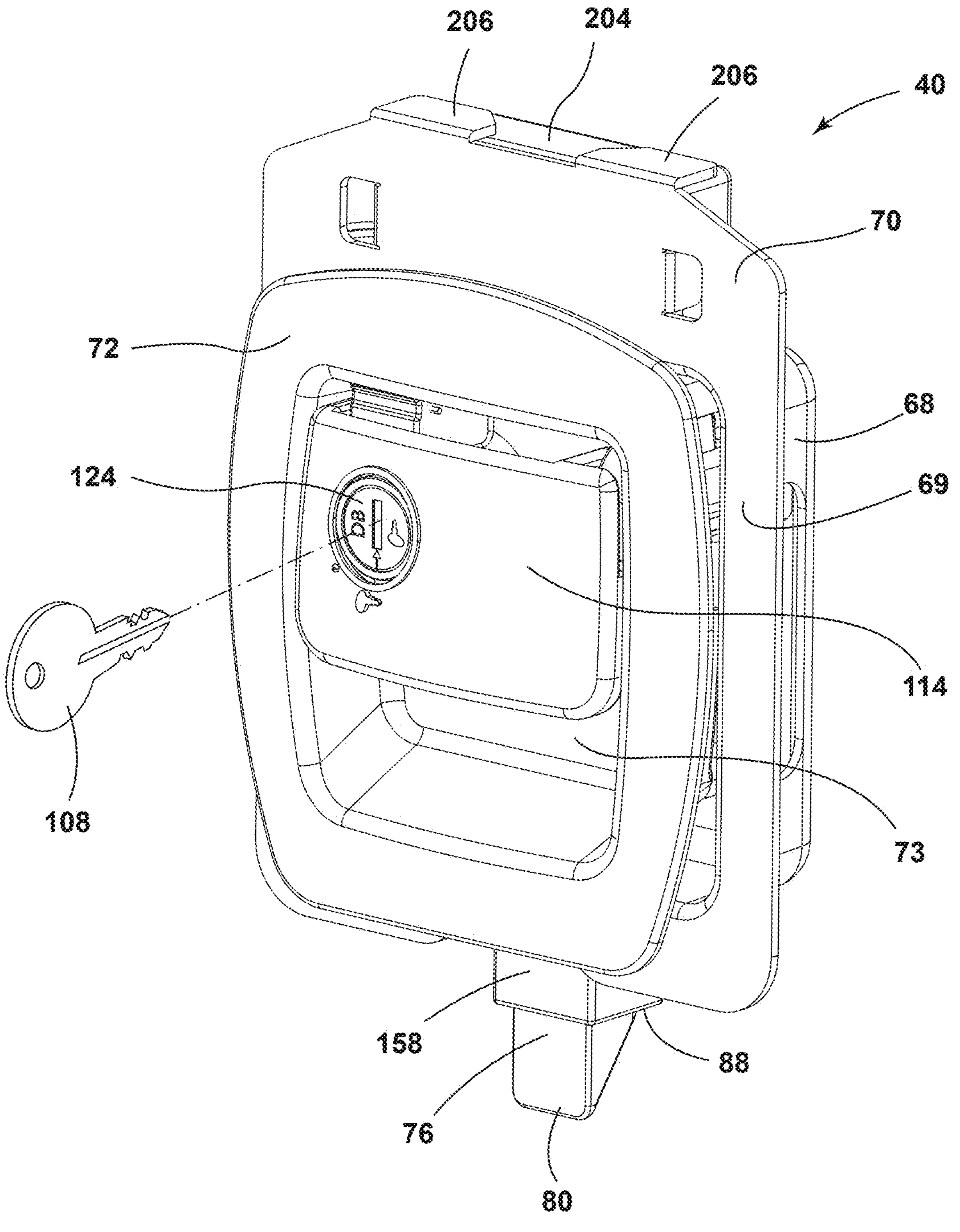
FIG. 17 is an exterior perspective view of the door latch assembly of a second embodiment of the door latch assembly shown in FIG. 2.

In one version of the present disclosure, key 108 may be adapted to allow removal from the lock cylinder 124 only when the lock cylinder 124 is returned to a vertical keyway position (neutral), as shown in FIGS. 3 and 17. The lock bolt clutch 152 allows the lock cylinder 124 to rotate 90 degrees clockwise or counterclockwise to rotate the lock bolt driver 144, which is offset from the center axis of the lock bolt clutch 152, and thus move the lock bolt 142 to the locked position or to the unlocked position. The lock bolt driver 144 on the lock bolt clutch 152 may thus be used to move the lock bolt 142 by operation of the key 108, as shown in FIGS. 13, 14, 29, and 30.

In a first manual mode, the lock bolt clutch 152 may be rotated by means of the key 108 and lock cylinder 124. The lock bolt driver 144 on the lock bolt clutch 152 then engages the lock bolt 142 to shift the lock bolt 142 to the unlocked position. The lock bolt clutch 152 and the lock bolt driver 144 mounted thereon may be then rotated back to the neutral or vertical position for the key 108 to be removed. Conversely, the lock bolt driver 144 on the lock bolt clutch 152 may engage the lock bolt 142 to transfer the lock bolt 142 to the locked position. Again, the lock bolt clutch 152 and attached lock bolt driver 144 is then rotated back to the neutral or vertical position for the key 108 to be removed.

To facilitate such operation, the lock bolt 142 may include a first bearing surface 162 and a second bearing surface 164 opposed to the first bearing surface 162, where the lock bolt clutch 152 and lock bolt driver 144 may be operably coupled with key lock cylinder 124. The lock bolt clutch 152 may be adapted to engage the lock bolt driver 144 against the first bearing surface 162 upon rotation of the lock cylinder 124 in a first rotational direction to displace the lock bolt 142 to the locked position. Conversely, the lock bolt clutch 152 and lock bolt driver 144 may be adapted to engage the lock bolt driver 144 against the second bearing surface 164 upon rotation of the lock cylinder 124 in a second rotational direction to displace the lock bolt 142 to the unlocked position.

Figure 34:
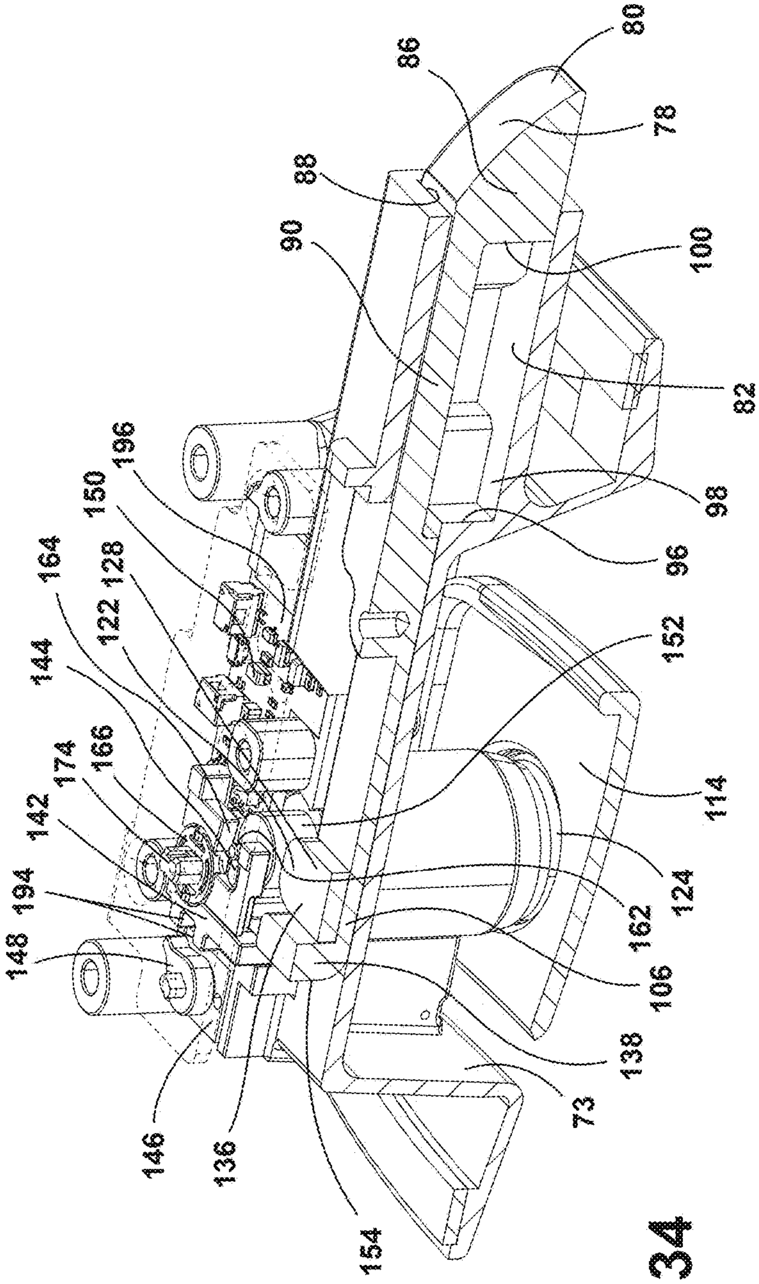
FIG. 34 is an internal perspective cross-sectional view of the locking mechanism of the door latch assembly of the present disclosure shown in FIG. 2, with the lock bolt shown in the unlocked position.
Figure 35:
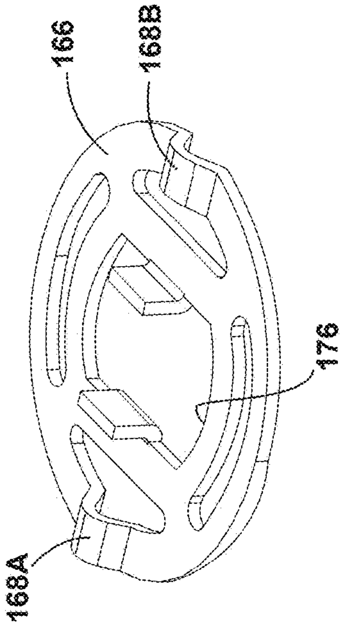
FIG. 35 is a perspective view of wafer spring of the door latch assembly of the present disclosure shown in FIG. 2.

As perhaps best shown in FIGS. 34 and 35, the lock bolt 142 may be releasably held in either the locked or unlocked position via a wafer spring 166. The wafer spring 166 may be provided with wafer spring protrusions 168A and 168B adapted to alternatively engage one of a pair of staggered detent holes 170A and 170B in a rigidly mounted stamped adjacent plate 172 to hold the lock bolt 142 in either the locked or unlocked positions, as perhaps best shown in FIG. 36. The lock bolt 142 may also include an elongated tab 174 extending upwardly through correspondingly shaped elongated slot 176 in the wafer spring 166. The wafer spring 166 may be adapted such that the first wafer spring protrusion 168A (or spring element) aligns with a first detent hole 170A on the adjacent plate 172 when the lock bolt 142 is the locked position, thus releasably delimiting the lock bolt 142 in the locked position. The wafer spring 166 may also adapted such that the second wafer spring protrusion 168B aligns with a second detent hole 170B on the adjacent plate 172 when the lock bolt 142 is the unlocked position, thus releasably delimiting the lock bolt 142 in the unlocked position. A plate slot 178, which is more elongated than the elongated tab 174, may also be provided on the adjacent plate 172 to allow translational motion of the elongated tab 174 of the lock bolt 142 relative the adjacent plate 172.

Figure 33:
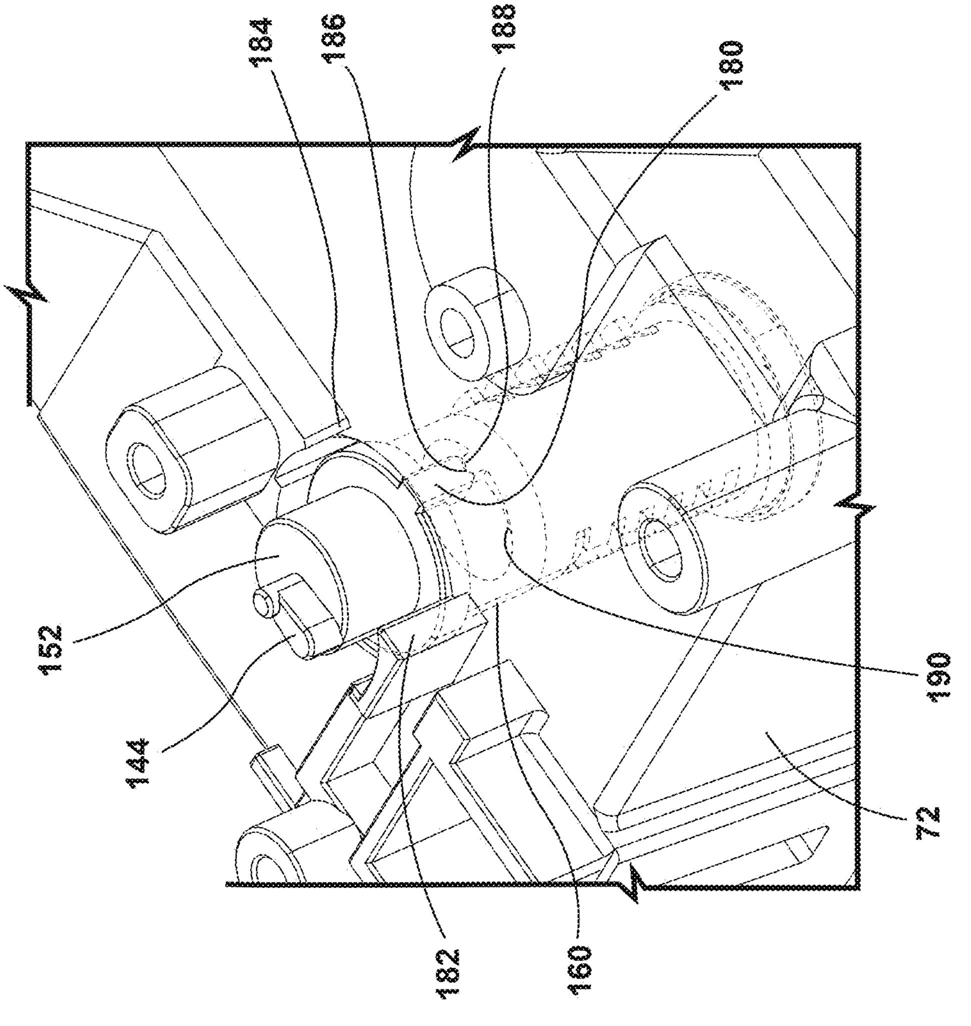
FIG. 33 is an internal perspective view of lock bolt driver and lock bolt clutch of the door latch assembly of the present disclosure shown in FIG. 2, with the lock bolt driver shown in the neutral position.

As shown in FIG. 33, the lock bolt clutch 152 may also include a rotational stop 180 and the outer housing 72 may include a first unlocked position limit stop 182 and a second locked position limit stop 184. The lock bolt clutch 152 may thus be delimited to rotation of the rotational stop 180 between the first unlocked position limit stop 182 and the second locked position limit stop 184. The rotational stop 180 of the lock bolt clutch 152 may also include a clutch detent 186 and the outer housing 72 may further include a protuberance 188 mounted on a shoulder 190 thereof and adapted to releasably engage the clutch detent 186 and urge the lock bolt clutch 152 in a neutral position between the first unlocked position limit stop 182 and the second locked position limit stop 184, thereby facilitating and allowing removal of the key 108. The electrically actuated motor 146 may be mounted within a recess 192 in the outer housing and operably coupled with the motor actuator 148, which in turn may be selectively operably coupled with the lock bolt 142. The motor actuator 148 may be situated to engage one of a pair of spaced tabs 194A and 194B on the lock bolt 142 to move the lock bolt 142 to the locked position or the unlocked position. As shown in FIGS. 15, 16, 28, 29, and 30, the motor actuator 148 may engage the spaced tab 194A upon rotation of the motor actuator 148 in a first rotational direction to displace the lock bolt 142 to the locked position. Conversely, the motor actuator 148 may engage space tab 194B upon rotation of the motor actuator 148 in a second rotational direction to displace the lock bolt 142 to the unlocked position. As shown, the motor actuator 148 may be configured as a motor cam that rotates in accordance with the electrically actuated motor 146 to engage the pair of spaced tabs 194A and 194B. However, it is also contemplated that the motor actuator 148 may be configured as a spur gear or a sector gear that may be adapted to engage a gear rack on the lock bolt 142 to displace the lock bolt 142 between the locked and unlocked positions upon reversible rotation of the electrically actuated motor 146.

Controller 150 may be provided for actuating the electrically actuated motor 146 and motor actuator 148. Controller 150 may be disposed on a circuit board 196, which may also be used to situate the electronic circuitry of the electrically actuated motor 146. The lock bolt 142 may further be equipped with an integral tab 198 in selective and alternative contact with one of either a first position switch 200 or a second position switch 202. The first position switch 200 signals to the controller 150 whether the lock bolt 142 is in the locked position and the second position switch 202 signals to the controller 150 whether the lock bolt 142 is in the unlocked position.

The door latch assembly 40 may thus include a keyless function using the electrically actuated motor 146 and motor actuator 148 to drive the lock bolt 142 between the locked and unlocked positions via a signal from a Bluetooth or wireless operating system similarly mounted on the circuit board 196. While the present disclosure describes the controller 150 as actuated by a wireless signal received by the controller 150, it is contemplated that the controller 150 may be also actuated by a remote physical switch (not shown) inside of the recreational vehicle 10. In addition, the controller 150 may be integrated with a system Gateway, or other universal control. It is further contemplated that the controller 150 can be programed, upon activation by an appropriate wireless signal, to lock and unlock an individual door latch assembly 40, some of the door latch assemblies 40, or all the door latch assemblies 40 simultaneously.

A battery pack 204 may be provided and adapted to energize the electrically actuated motor 146. As shown in the Figures, battery pack 204 may be mounted to the inner housing 70, where it may be readily accessible by the user to facilitate battery changes. Battery pack 204 may be mounted to the inner housing 70 by a pair of resilient holders 206. Alternatively, battery pack 204 may be attached next to the door latch assembly 40 on the inside of the storage compartment door assembly 38 by means of a mechanical fastener (screws). Alternatively, or in addition, the battery pack 204 may be fixed by other methods, such as Velcro, owing to ease as a method of attaching or removing the battery pack 204.

Two separate electrical connector cables 208, 210 may be provided on circuit board 196. One electrical connector cable 208 may be provided for coupling the electrically actuated motor 146 with the circuit board 196 and the second electrical connector cable 210 may be employed to provide power to the circuit board 196 from the battery pack 204, as shown in FIGS. 4 and 18. An on/off switch 212 may be provided on the inner housing 70 and/or on the battery pack 204 to switch the battery pack 204 off and thereby deenergize the controller 150 if remote actuation of the lock bolt 142 is undesired or to save battery charge, as also shown in FIGS. 4 and 18.

As further shown in FIGS. 4 and 18, the battery pack 204 may also be used to power a microprocessor/Bluetooth/wireless module that will communicate via a signal from a remote device, such as a Bluetooth device (a cell phone), key fob, or a keyless entry door latch assembly 20. The signal may be used to direct the electrically actuated motor 146 to rotate in the direction of locking or unlocking depending upon the command. The user may be provided with feedback because the switches 200, 202 on the circuit board 196 may indicate if the lock bolt 142 is in the locked or unlocked position. The controller 150 may be powered by a 9V battery, but other batteries and sizes may be employed. Advantageously, the use of standard 9V batteries avoids the need for special wiring.

In the first embodiment shown in FIGS. 3-16, the retractable latch plunger 76 may include the lock bolt stop 154 at a proximal end 106 of the retractable latch plunger 76 that is engaged by the lock bolt 142 when the lock bolt 142 is displaced to the locked position and thereby prevents displacement of the retractable latch plunger 76 from the extended to the retracted position. The lock bolt stop 154 thus disposed at the proximal end 106 of the retractable latch plunger 76 may be engaged by the lock bolt 142 when the lock bolt 142 is displaced to the locked position.

Alternatively, or in addition to, in the second embodiment shown in FIGS. 17-32, the paddle cam 120 may include the lock bolt stop 154 that is engaged by the lock bolt 142 when the lock bolt 142 is displaced to the locked position and thereby prevents actuation of the exterior latch paddle handle 114 from the closed position to the open position. The lock bolt stop 154 may thus be disposed on the paddle cam 120 that is engaged by the lock bolt 142 when the lock bolt 142 is displaced to the locked position. In either embodiment, the lock bolt stop 154 may be engaged by the lock bolt 142 when the lock bolt is displaced to the locked position and thereby ultimately prevents displacement of the retractable latch plunger 76 from the extended to the retracted position.

The lock bolt 142 is thus selectively displaceable between the locked position and the unlocked position by either the lock cylinder 124 or the controller 150. The lock cylinder 124 or the electrically actuated motor 146 can move the lock bolt 142 from the unlocked position to the locked position and vice versa. Essentially, the electrically actuated motor 146 rotates the motor actuator 148 to selectively slide the lock bolt 142 to the locked or unlocked position. In the first embodiment, the door latch assembly 40 is locked by shifting the lock bolt 142 (either by the electrically actuated motor 146 responding to a keyless signal or the lock bolt clutch 152 with the key 108 and lock cylinder 124) to prevent the loaded retractable latch plunger 76 from retracting, which would otherwise allow the storage compartment door assembly 38 to open. In the second embodiment, the door latch assembly 40 is locked by shifting the lock bolt 142 (again, either by the electrically actuated motor 146 responding to a keyless signal or the lock bolt clutch 152 with the key 108 and lock cylinder 124) to prevent the paddle cam 120 from rotating, thereby preventing the retractable latch plunger 76 from retracting, which would otherwise allow the storage compartment door assembly 38 to open.

Figure 36:
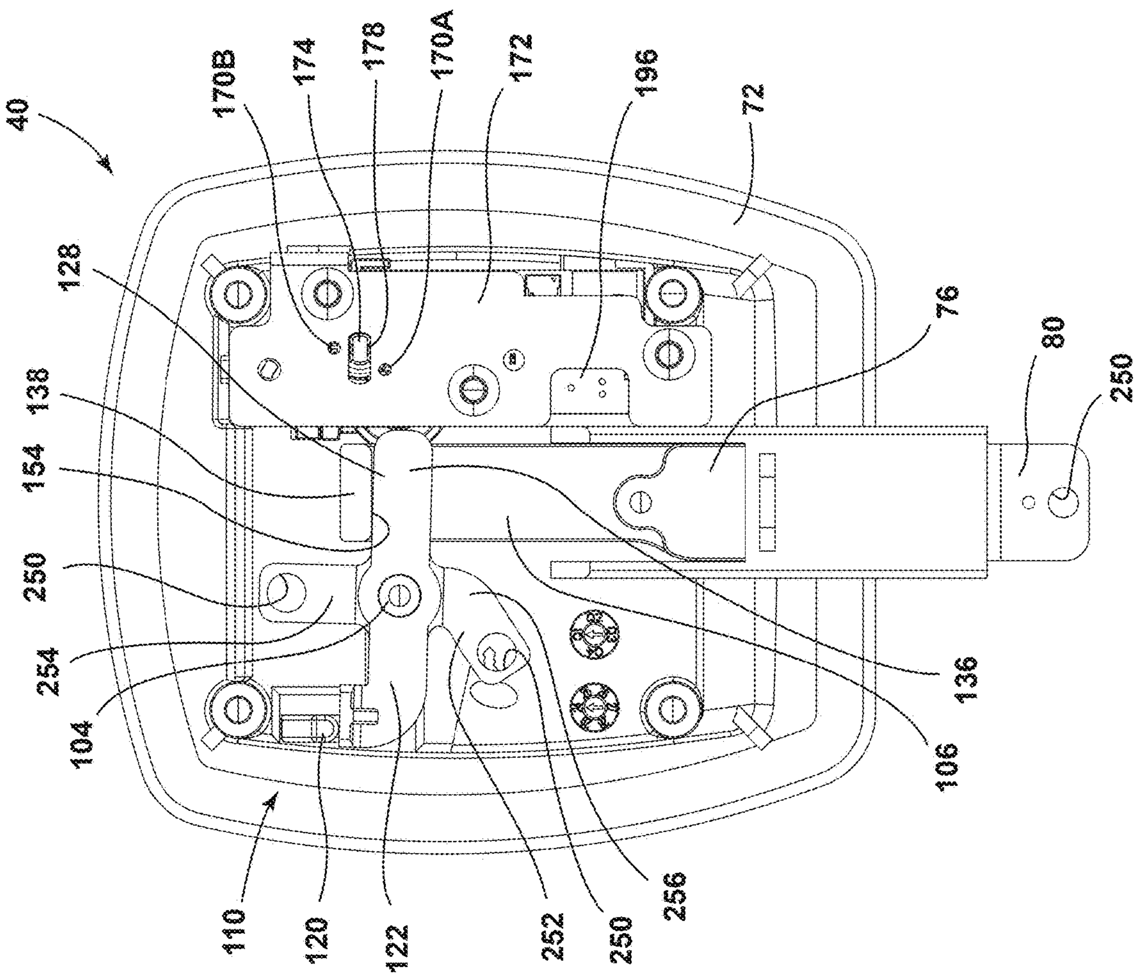
FIG. 36 is an internal plan view of the door latch assembly of the first embodiment of the door latch assembly shown in FIG. 2, provided with remote latch mounts.
Figure 37:
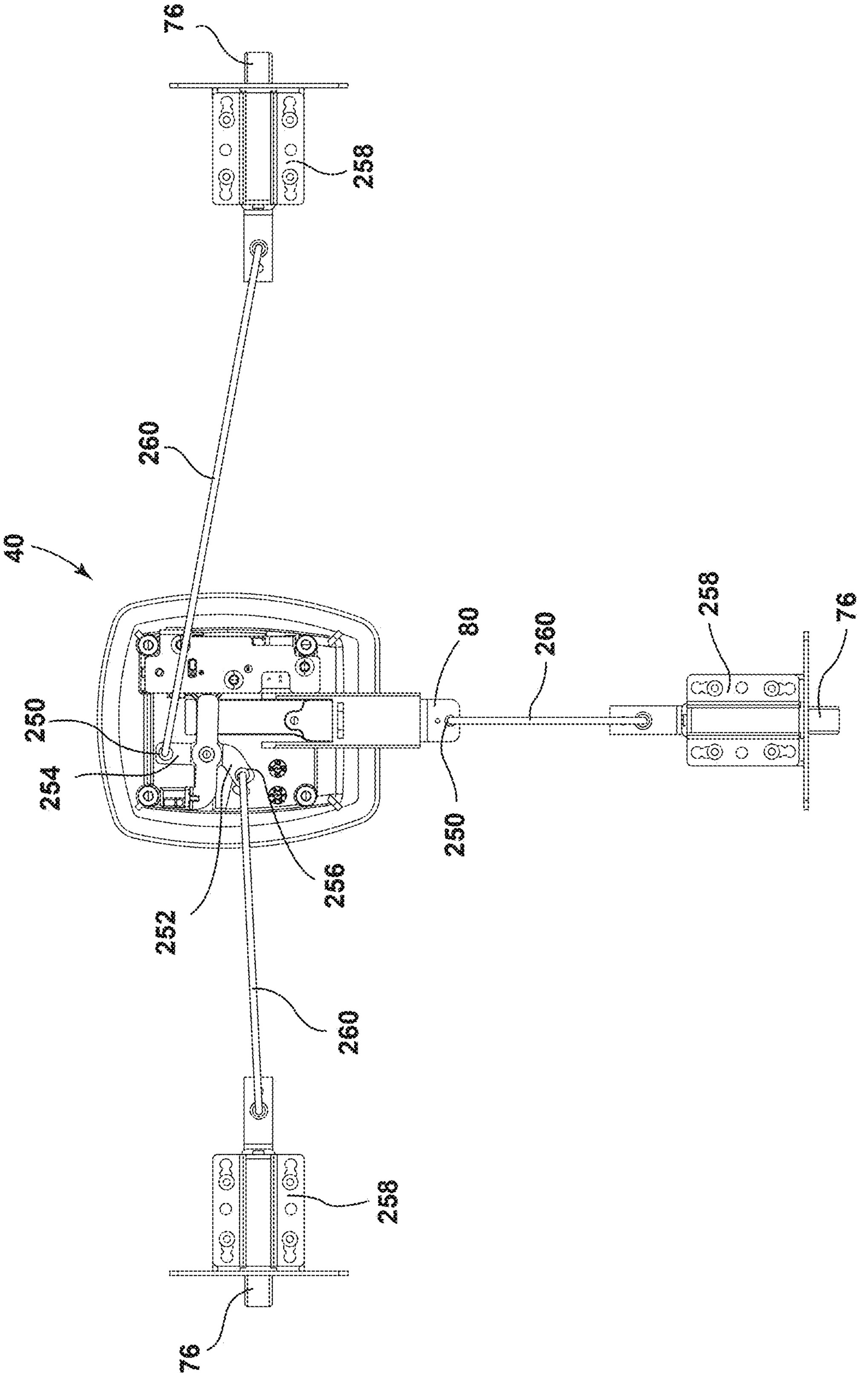
FIG. 37 is a plan view of the door latch assembly of FIG. 36 operably coupled with a plurality of perimeter plunger latches.

In a further refinement of at least the first embodiment, the inclined surface 78 on the distal end 80 of the plunger 76 of the door latch assembly 40 may be replaced with a remote latch mount 250, as shown in FIGS. 36 and 37, and the plunger cam 122 may be provided with a remote linkage cam 252 having an upper arm end 254 and a lower arm end 256, each of which may be similarly provided with a remote latch mount 250. The remote linkage cam 252 may be mounted orthogonally with and fixed to the plunger cam 122, such that the remote linkage cam 252 rotates simultaneously and in unison with the plunger cam 122.

In addition, one or more perimeter plunger door latches 258 may be disposed about the outer perimeter of the storage compartment door assembly 38, each provided with a retractable plunger 76 as described above, as shown in FIG. 37. It should be appreciated that a rotary latch (not shown) could also be provided. Each of the perimeter plunger door latches 258 may be operably coupled with one of the remote latch mounts 250 situated on distal end 80 of the plunger 76 or one of the remote latch mounts 250 situated on the upper arm end 254 or lower arm end 256 of the remote linkage cam 252.

A linkage 260, which may include a flexible cable, a semi-rigid rod, or a rigid rod, may be employed to operably couple one of the remote latch mounts 250 with one of the perimeter plunger door latch 258. As can be seen in FIGS. 36 and 37, rotation of the plunger cam 122 will rotate the remote linkage cam 252 in the counterclockwise direction, which in the unlocked condition will also operate to retract plunger 76 within the door latch assembly 40. With such movement, each of the remote latch mounts 250 will also be displaced away from the perimeter plunger door latch 258 to which they may be operably coupled, thereby causing the retractable plunger 76 on each of the perimeter plunger door latches 258 to simultaneously retract and allowing the storage compartment door assembly 38 to be opened.

In operation, lock bolt 142 may be placed in the locked position, where it prevents the motion of the retractable latch plunger 76. When electrically energized, the electrically actuated motor 146 rotates the motor actuator 148, which in turn moves the lock bolt 142 out of the way of the retractable latch plunger 76 or the paddle cam 120 so the door latch assembly 40 can be operated by lifting the exterior latch paddle handle 114 to retract the retractable latch plunger 76 plunger. Circuit board 196 may be provided with position switches 200, 202 to provide the controller 150 information on whether the lock bolt 142 is in the locked or unlocked position. This will determine the direction of rotation of the electrically actuated motor 146 when the controller 150 receives a wireless signal to lock or unlock the door latch assembly 40. It should be noted that key 108 may be adapted to always override the electrically actuated motor 146 and may be allowed to move the lock bolt 142 to either the locked or unlocked positions. It is further contemplated that the user may receive wireless feedback on status of the door latch assembly 40 via a smart device, such a cell phone, and thereby acquire information on whether the door latch assembly 40 is locked or unlocked. Such feedback and smart device use may also be used to control one or multiple door latch assemblies 40.

The benefits of the door latch assembly 40 of the present disclosure is that current vehicles equipped with conventional door latches may be simply and readily upgraded to the keyless door latch assembly 40 as disclosed herein. To with, the door latch assembly 40 disclosed herein may be adapted to exactly fit the cut-out or opening 74 of current compartment or baggage door latches. The present disclosure offers a simple, efficient design and provides the user an opportunity to upgrade their system to a Bluetooth or wireless option for the storage compartment door assembly 38 without otherwise modifying the storage compartment door assembly 38.

While the illustrated embodiments show the keyless compartment door latch assembly 40, it will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term “coupled” or “operably coupled” (in all its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention is claimed as follows:

1. A compartment door latch comprising:

an inner housing and an outer housing forming an interior chamber;

a plunger mounted to an interior face of one of the inner housing or the outer housing, the plunger having an extended position and a retracted position, and a resilient member operably coupled with the plunger and urging the plunger to the extended position;

a plunger actuator operably coupled with the plunger, the plunger actuator comprising a manually actuated exterior latch paddle handle mounted to an outer face of the outer housing, a paddle cam operably coupled with the exterior latch paddle handle, and a plunger cam operably coupled with the paddle cam and the plunger, whereupon actuation of the exterior latch paddle handle from a closed position to an open position displaces the paddle cam and rotates the plunger cam to displace the plunger from the extended position to the retracted position against the urging of the resilient member; and a locking mechanism comprising a lock bolt having a locked position and an unlocked position and adapted to prevent movement of the plunger in the locked position, a lock bolt driver operably coupled with a key lock and operably coupled with the lock bolt, an electrically actuated motor and a motor actuator operably coupled with the lock bolt, and a controller for actuating the electrically actuated motor and motor actuator;

wherein the lock bolt is selectively displaceable between the locked position and the unlocked position by either of the key lock or the controller; and wherein:

the plunger further comprises a lock bolt stop that is engaged by the lock bolt when the lock bolt is displaced to the locked position and thereby prevent displacement of the plunger from the extended to the retracted position; or the paddle cam further comprises a lock bolt stop that is engaged by the lock bolt when the lock bolt is displaced to the locked position and thereby prevent actuation of the exterior latch paddle handle from the closed position to the open position.

2. The compartment door latch of claim 1, wherein the controller is actuated by a remote physical switch or a wireless signal received by the controller.

3. The compartment door latch of claim 1, wherein:

the lock bolt further comprises a first bearing surface and a second bearing surface opposed to the first bearing surface and the locking mechanism further comprises a lock bolt clutch operably coupled with key lock;

the lock bolt clutch is adapted to engage the lock bolt driver against the first bearing surface upon rotation of the key lock in a first rotational direction to displace the lock bolt to the locked position; and the lock bolt clutch is adapted to engage the lock bolt driver against the second bearing surface upon rotation of the key lock in a second rotational direction to displace the lock bolt to the unlocked position.

4. The compartment door latch of claim 1, wherein:

the motor actuator comprises a motor cam and the lock bolt further comprises a pair of spaced tabs extending from a surface of the lock bolt;

the motor cam is adapted to engage the spaced tabs upon rotation of the motor cam in a first rotational direction to displace the lock bolt to the locked position; and the motor cam is adapted to engage the spaced tabs upon rotation of the motor cam in a second rotational direction to displace the lock bolt to the unlocked position.

5. The compartment door latch of claim 1, further comprising a lock bolt position switch adapted to provide a signal to the controller whether the lock bolt is in the locked position or the unlocked position.

6. The compartment door latch of claim 5, further comprising a pair of lock bolt position switches, including a first position switch for signaling to the controller whether the lock bolt is in the locked position and a second position switch adapted to provide a signal to the controller whether the lock bolt is in the unlocked position.

7. The compartment door latch of claim 6, wherein the lock bolt further comprises an integral tab in selective and alternative contact with one of either the first or second position switches.

8. A compartment door latch for a closable compartment door having an outer perimeter comprising:

a housing forming an interior chamber and mounted to the compartment door;

a plunger mounted within the housing, the plunger having an extended position extending outside of the perimeter of the compartment door and a retracted position retracted within the perimeter of the compartment door, and a resilient member operably coupled with the plunger and urging the plunger to the extended position;

a manually actuated exterior latch paddle handle mounted to an outer face of the housing, the exterior latch paddle handle having a closed position and an open position;

a paddle cam operably coupled with the exterior latch paddle handle and extending into the interior chamber;

a plunger cam operably coupled with the paddle cam and the plunger, whereupon actuation of the exterior latch paddle handle from the closed position to the open position displaces the paddle cam and actuates the plunger cam to displace the plunger from the extended position to the retracted position against the urging of the resilient member; and a lock bolt having a locked position and an unlocked position and adapted to prevent movement of the plunger in the locked position;

a lock bolt driver disposed upon a lock bolt clutch operably coupled with a key lock and operably coupled with the lock bolt, wherein a lock bolt clutch and the lock bolt driver are rotatable between a first locked position and a second unlock position; and an electrically actuated motor and a motor actuator operably coupled with the lock bolt, and a controller for actuating the motor actuator, wherein the motor actuator is rotatable between a first locked position and a second unlock position;

wherein the lock bolt is selectively displaceable between the locked position and the unlocked position by either of the key lock or the controller; and wherein the lock bolt further comprises a tab extending through a slot in a wafer spring and wherein the wafer spring has a first spring element that aligns with a first detent on an adjacent plate within the housing when the lock bolt is the locked position and the wafer spring has a second spring element that aligns with a second detent on the adjacent plate within the housing when the lock bolt is the unlocked position.

9. The compartment door latch of claim 8, wherein the lock bolt clutch comprises a rotational stop and the housing includes a first unlocked position limit stop and a second locked position limit stop, whereby the lock bolt clutch is limited to rotation of the rotational stop between the first unlocked position limit stop and the second locked position limit stop.

10. The compartment door latch of claim 9, wherein the rotational stop of the lock bolt clutch further comprises a detent and the housing further comprises a protuberance adapted to releasably engage the detent and hold the lock bolt clutch in a neutral position between the first locked position limit stop and the second unlocked position limit stop.

11. The compartment door latch of claim 8, wherein the plunger cam comprises a paddle cam arm end in juxtaposed relation to the paddle cam, a plunger cam arm end in juxtaposed relation to the plunger, and a pivot disposed between the paddle cam arm end and the plunger cam arm end about which the plunger cam is adapted to rotate.

12. The compartment door latch of claim 11, wherein the plunger cam arm end of the plunger cam has a curvilinear shape about a distal end thereof and is adapted for sliding movement relative a bearing surface of a plunger tab disposed at a proximal end of the plunger and engaged by the plunger cam arm end of the plunger cam during rotation of the plunger cam.

13. The compartment door latch of claim 12, wherein the bearing surface of the plunger tab at the proximal end of the plunger has a curvilinear shape.

14. The compartment door latch of claim 11, wherein the paddle cam arm end and the plunger cam arm end are co-linear.

15. The compartment door latch of claim 11, wherein the paddle cam arm end and the plunger cam arm end are offset.

16. The compartment door latch of claim 8, wherein the plunger further comprises a lock bolt stop at a proximal end of the plunger that is engaged by the lock bolt when the lock bolt is displaced to the locked position and thereby prevent displacement of the plunger from the extended to the retracted position.

17. The compartment door latch of claim 8, wherein the paddle cam further comprises a lock bolt stop that is engaged by the lock bolt when the lock bolt is displaced to the locked position and thereby prevents actuation of the exterior latch paddle handle from the closed position to the open position.

18. A compartment door latch for a closable compartment door having an outer perimeter comprising:

an inner housing comprising a base plate having a base recess in an outer face thereof;

an outer housing comprising a paddle recess in an outer face thereof, wherein the paddle recess is received within the base recess and an interior chamber is defined therebetween;

a plunger mounted to one of the inner housing or outer housing, the plunger having an extended position extending outside of the perimeter of the compartment door and a retracted position retracted within the perimeter of the compartment door, and a resilient member operably coupled with the plunger and urging the plunger to the extended position a plunger actuator operably coupled with the plunger, the plunger actuator comprising a manually actuated exterior latch paddle handle rotatably mounted to the outer face and within the paddle recess of the outer housing, a paddle cam operably coupled with the exterior latch paddle handle, and a plunger cam rotatably mounting and operably coupled with the paddle cam and the plunger, whereupon actuation of the exterior latch paddle handle from a closed position to an open position displaces the paddle cam and rotates the plunger cam to displace the plunger from the extended position to the retracted position against the urging of the resilient member;

a locking mechanism comprising a lock bolt having a locked position and an unlocked position, a lock bolt driver disposed on a lock bolt clutch and operably coupled with a key lock and operably coupled with the lock bolt, an electrically actuated motor and a motor actuator operably coupled with the lock bolt, and a controller for actuating the electrically actuated motor and motor actuator;

a battery pack adapted to energize the electrically actuated motor mounted to the inner housing;

a lock bolt stop disposed at a proximal end of the plunger that is engaged by the lock bolt when the lock bolt is displaced to the locked position or a lock bolt stop disposed on the paddle cam that is engaged by the lock bolt when the lock bolt is displaced to the locked position;

a remote latch mount disposed on the plunger of the compartment door latch or a remote linkage cam mounted to the plunger cam, such that the remote linkage cam rotates simultaneously and in unison with the plunger cam; and one or more perimeter door latches disposed about an outer perimeter of the compartment door, wherein at least one of the plurality of perimeter door latches is operably coupled with the remote latch mount by a linkage;

wherein the lock bolt is selectively displaceable between the locked position and the unlocked position by either of the key lock or the controller.

19. The compartment door latch of claim 18, wherein the linkage comprises further a flexible cable, a semi-rigid rod, or a rigid rod, whereby actuation of the plunger actuator displaces the remote latch mount away from at least one of the perimeter plunger latches to which the remote latch mount is operably coupled causing a retractable plunger on the at least one of the perimeter plunger latches to retract and allowing the compartment door to be opened.

20. The compartment door latch of claim 18, wherein the remote linkage cam comprises an upper arm end and a lower arm end and the remote linkage cam is mounted orthogonally with and fixed to the plunger cam.

21. The compartment door latch of claim 20, wherein the remote latch mount is situated on a distal end of the plunger of the compartment door latch, on the upper arm end of the remote linkage cam, or the lower arm end of the remote linkage cam.

22. The compartment door latch of claim 21, further comprising a plurality of remote latch mounts, wherein one of the plurality of remote latch mounts is situated on each of the distal end of the plunger of the compartment door latch, on the upper arm end of the remote linkage cam, and the lower arm end of the remote linkage cam.

* * * * *